US010200555B2

United States Patent
Tokuda et al.

(10) Patent No.: US 10,200,555 B2
(45) Date of Patent: Feb. 5, 2019

(54) INFORMATION PROCESSING APPARATUS, SYSTEM, METHOD OF INFORMATION PROCESSING AND RECORDING MEDIUM TO CONNECT A PRINTER AND A DISPLAY THROUGH A NETWORK INTERFACE TO OBTAIN IMAGES FROM A SOCIAL NETWORK SERVICE (SNS) SERVER

(71) Applicants: Hiromi Tokuda, Tokyo (JP); Jun Kimura, Tokyo (JP); Yutaka Yagiura, Kanagawa (JP)

(72) Inventors: Hiromi Tokuda, Tokyo (JP); Jun Kimura, Tokyo (JP); Yutaka Yagiura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/596,033

(22) Filed: May 16, 2017

(65) Prior Publication Data
US 2017/0339298 A1 Nov. 23, 2017

(30) Foreign Application Priority Data

May 20, 2016 (JP) ................. 2016-101242

(51) Int. Cl.
G06F 3/12 (2006.01)
H04N 1/00 (2006.01)
(Continued)

(52) U.S. Cl.
CPC ......... H04N 1/00912 (2013.01); H04L 51/32 (2013.01); H04N 1/00251 (2013.01); H04N 1/00267 (2013.01); H04N 1/00344 (2013.01); H04N 1/32122 (2013.01); H04N 1/32133 (2013.01); H04W 4/21 (2018.02); H04L 67/02 (2013.01); H04N 2201/0039 (2013.01); H04N 2201/0082 (2013.01); H04N 2201/3269 (2013.01); H04N 2201/3274 (2013.01)

(58) Field of Classification Search
CPC ................. H04L 51/32; H04L 67/02
See application file for complete search history.

(56) References Cited

U.S. PATENT DOCUMENTS

2005/0114759 A1* 5/2005 Williams .............. G06Q 10/10 715/221
2011/0090529 A1* 4/2011 Hertling .............. G06F 3/1204 358/1.15

(Continued)

OTHER PUBLICATIONS

PICSPOT "PICSPOT Printer" Retrieved from the Internet: URL:http://picspot.asia/printer/, searched on Apr. 17, 2017.

(Continued)

Primary Examiner — Henok A Shiferaw
(74) Attorney, Agent, or Firm — Harness, Dickey & Pierce, P.L.C.

(57) ABSTRACT

An information processing apparatus to connect with a printer and a display, includes: a processor to control the printer to print one or more images that are obtained to output one or more printed images, in response to a print request received from a first user; and control the display to display the one or more images that have been printed with the printer, the images being displayed to one or more users other than the first user.

16 Claims, 20 Drawing Sheets

(51) Int. Cl.
*H04L 12/58* (2006.01)
*H04N 1/32* (2006.01)
*H04W 4/21* (2018.01)
*H04L 29/08* (2006.01)

(56) References Cited

U.S. PATENT DOCUMENTS

2015/0116761 A1\* 4/2015 Yamada ................ G06F 3/1265
 358/1.15
2015/0249756 A1\* 9/2015 Motegi ................ G06F 3/1285
 358/1.13

OTHER PUBLICATIONS

Bizicard "BiziCard" Retrieved from the Internet: URL: http://www.bizicard.net/service/, searched on Apr. 17, 2017.

\* cited by examiner

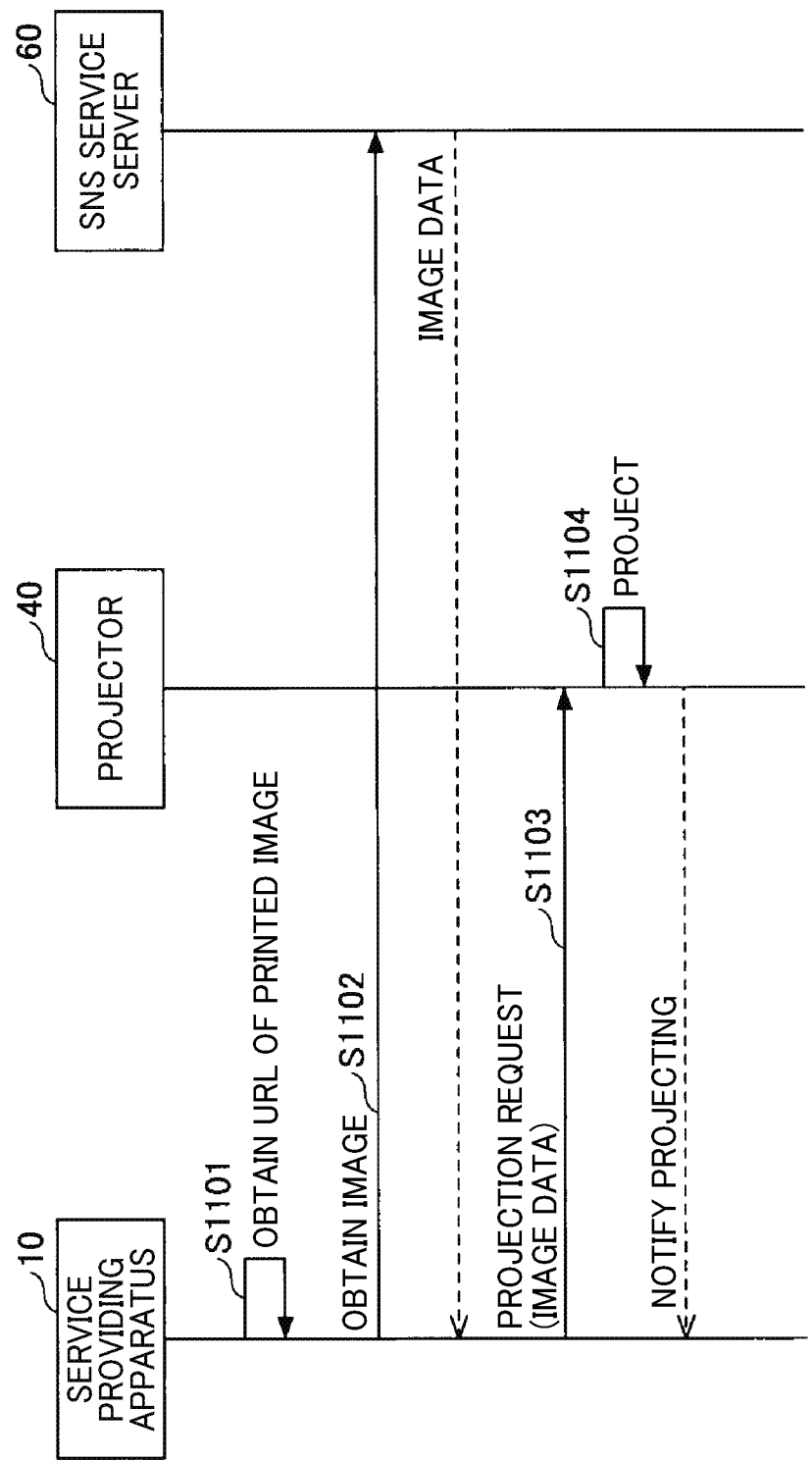

| STORAGE PATH | PRINT STATUS |
|---|---|
| C://image/123.jpg | DONE |
| C://image/abc.jpg | NOT DONE |
| C:// ··· | NOT DONE |
| C:// ··· | DONE |
| ⋮ | ⋮ |

109

| STORAGE PATH | PRINT STATUS | RELATED CONTENT STORAGE URL |
|---|---|---|
| C://image/123.jpg | DONE | http://servicea.co.jp/movie.mpg |
| C://image/abc.jpg | NOT DONE | http://servicea.co.jp/voice.wav |
| C:// ··· | NOT DONE | http:// ··· |
| C:// ··· | DONE | http:// ··· |
| ⋮ | ⋮ | ⋮ |

109A

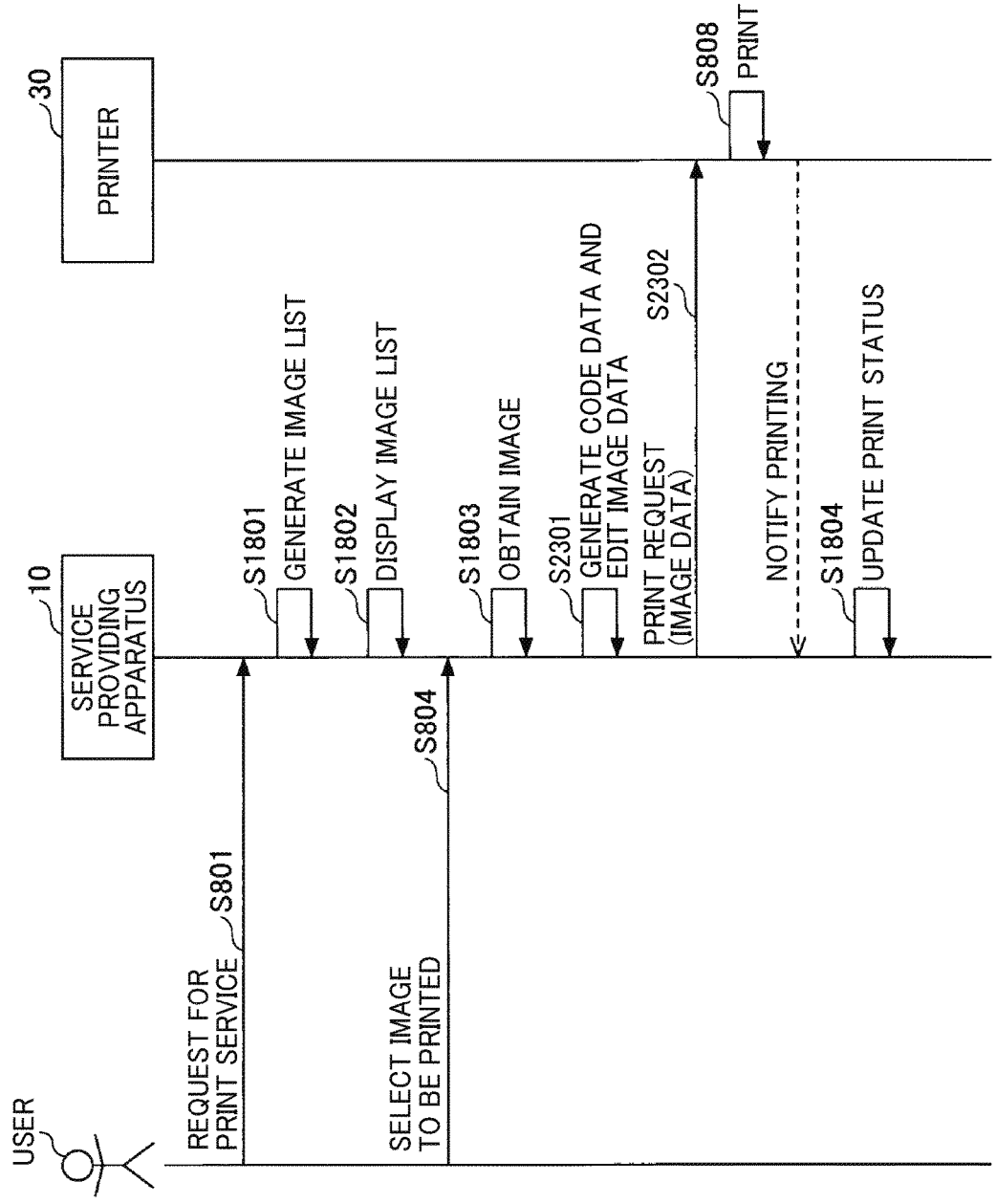

INFORMATION PROCESSING APPARATUS, SYSTEM, METHOD OF INFORMATION PROCESSING AND RECORDING MEDIUM TO CONNECT A PRINTER AND A DISPLAY THROUGH A NETWORK INTERFACE TO OBTAIN IMAGES FROM A SOCIAL NETWORK SERVICE (SNS) SERVER

CROSS-REFERENCE TO RELATED APPLICATIONS

This patent application is based on and claims priority pursuant to 35 U.S.C. § 119(a) to Japanese Patent Application No. 2016-101242, filed on May 20, 2016, in the Japan Patent Office, the entire disclosure of which is hereby incorporated by reference herein.

BACKGROUND

Technical Field

The present invention generally relates to an apparatus, system, and method of information processing, and a non-transitory recording medium.

Description of the Related Art

Recently, any individual user can upload any picture taken by the user on a network to share such picture with others. For example, the user may post the picture on the social networking service (SNS) to share his or her experiences with others.

SUMMARY

Example embodiments of the present invention include an information processing apparatus to connect with a printer and a display, which includes: a processor to control the printer to print one or more images that are obtained to output one or more printed images, in response to a print request received from a first user; and control the display to display the one or more images that have been printed with the printer, the images being displayed to one or more users other than the first user.

In one embodiment, an information processing apparatus to connect with a printer and a display is provided, which includes: a network interface to obtain one or more images from a social network service (SNS) server through a network; and a processor to control the printer to print the one or more images that are obtained to output one or more printed images, in response to a print request received from a first user; and control the display to display the one or more images that have been printed with the printer, the images being displayed to one or more users other than the first user.

In other embodiment, an information processing apparatus to connect with a printer and a display is provided, which includes: a memory to store, for each one of a plurality of images captured with an image capturing device, information indicating a storage area where the image is stored and a print status indicating whether the image has been printed with the printer; and a processor to: in response to an instruction for selecting one or more images to be printed from a first user, control the printer to print the one or more images of the plurality of images to output one or more printed images; update, for each of the one or more images that have been printed, the print status to indicate that the image has been printed with the printer; and control the display to display one or more images that have been printed with the printer, each being associated with the print status indicating that the image has been printed, the images being displayed to one or more users other than the first user.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 11 is a data sequence diagram illustrating operation of projecting the printed images, performed by the service providing system of FIG. 5, according to the first embodiment;

FIG. 23 is a data sequence diagram illustrating operation of printing images, performed by the service providing system of FIG. 20, according to the fourth embodiment.

Figure 1:
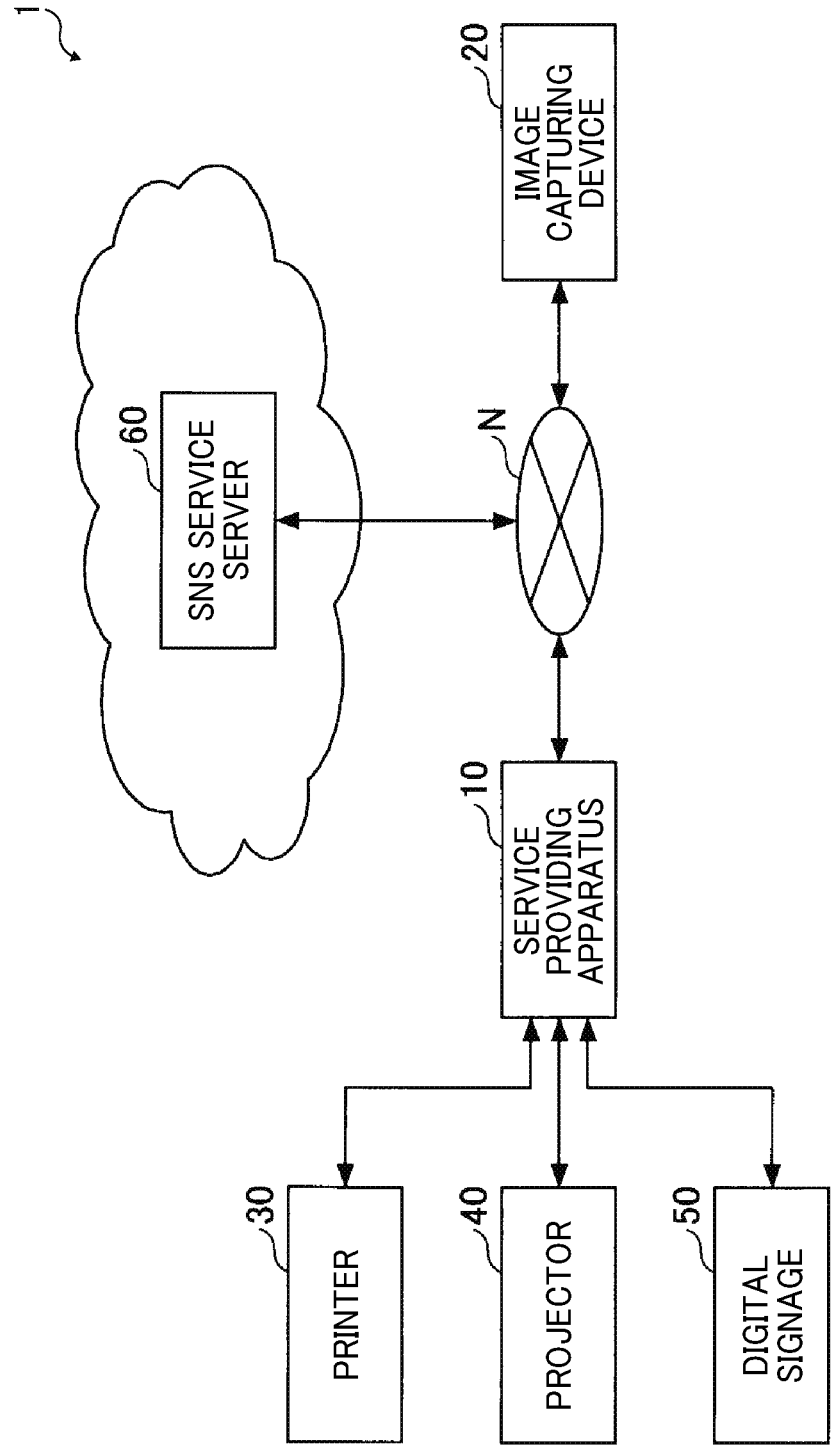
FIG. 1 is a schematic diagram illustrating a system configuration of a service providing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described.

Referring to FIG. 1, a system configuration of a service providing system 1 is described according to a first embodiment. FIG. 1 is a schematic diagram illustrating a system configuration of the service providing system 1 according to the first embodiment.

The service providing system 1 of FIG. 1 includes a service providing apparatus 10, an image capturing device 20, a printer 30, a projector 40, and a digital signage 50. The service providing apparatus 10 and the image capturing device 20 are connected to a SNS service server 60 ("SNS service 60") through a wide network such as the Internet to be communicable with each other.

The SNS service 60 provides various types of services to one or more users, such as sharing of images including pictures or photos (images) with others, transmitting or receiving messages, and posting diaries as a blog. In this embodiment, the SNS service 60 corresponds to any desired SNS service available in the public, such as Facebook (registered trademark), Twitter (registered trademark), and Instagram (registered trademark).

The service providing apparatus 10 is an information processing apparatus that provides a print service in cooperation with the SNS service 60, using the printer 30. In one example, in response to a user instruction, the service providing apparatus 10 provides, to the user, the print service that prints the pictures (images) posted on the SNS service 60 with the printer 30.

Further, the service providing apparatus 10 controls the projector 40 or the digital signage 50 to display the pictures (images), which have been obtained from the SNS service 60 and printed with the printer 30.

The image capturing device 20 is implemented by, for example, a smart phone, tablet, digital camera, mobile phone, portable game machine, or portable music player, each provided with an image capturing function. That is, the image capturing device 20 is any electronic device capable of capturing pictures (images), which can be carried by a user. Using the image capturing device 20, the user is able to take pictures and post the pictures on the SNS service 60.

The printer 30 is a printer capable of printing the pictures (images) selected by the user, for example, at the service providing apparatus 10. While the printer 30 is independent of the service providing apparatus 10 in this embodiment, the printer 30 may be partly or entirely incorporated in the service providing apparatus 10.

The projector 40 is any type of projector capable of projecting the pictures (images) printed with the printer 30, for example, on a screen. The digital signage 50 is any type of digital signage capable of displaying the pictures (images) printed with the printer 30. In this embodiment, it is assumed that the service providing system 1 at least includes one of the projector 40 and the digital signage 50. In other words, as long as it is capable of notifying other user of the pictures (images) that have been printed with the printer 30, any desired type or any number of such output devices may be provided.

The service providing apparatus 10, the printer 30, the projector 40, and the digital signage 50 may be placed at any desired location. Examples of installation place include, but not limited to, a concert hall or any other event hall where an event (fashion show, wedding ceremony, etc.) is taking place, and a shopping mall or any shop or store in the shopping mall or any other place (hair salon, etc.

The service providing system 1 may have a configuration other than the configuration illustrated in FIG. 1. For example, the service providing system 1 may include any number of the service providing apparatus 10, the printer 30, the projector 40, and the digital signage 50.

For example, the service providing system 1 may further include any desired type of display, such as a large-size display panel, capable of displaying the pictures (images) printed with the printer 30.

Figure 2:
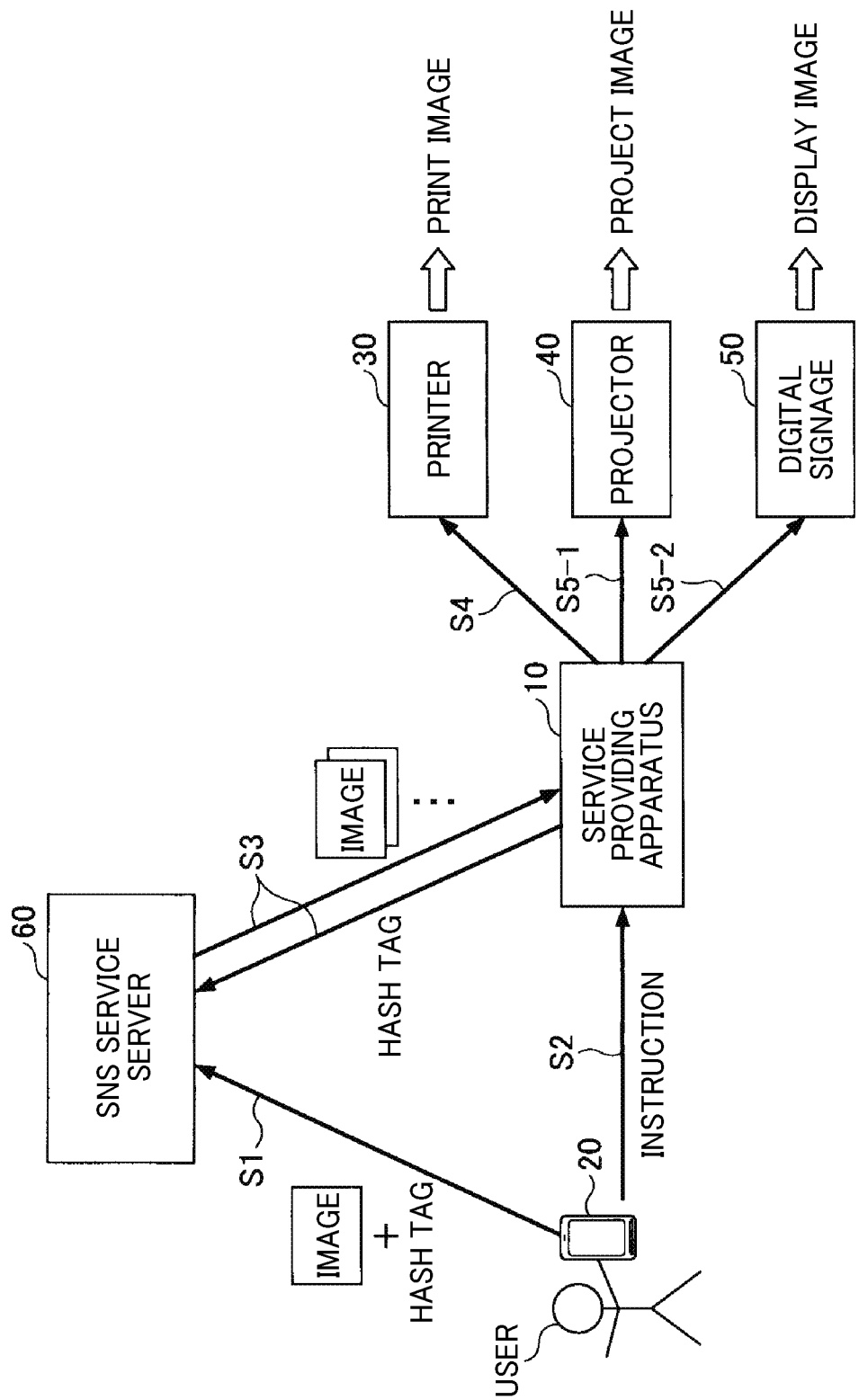
FIG. 2 is a schematic diagram illustrating operation of the service providing system illustrated in FIG. 1 according to a first embodiment.

Referring now to FIG. 2, example operation of the service providing system 1 is described. FIG. 2 is a schematic diagram illustrating operation of the service providing system 1 according to the first embodiment. For simplicity, it is assumed that the service providing system 1 is placed at the event hall. Further, for the descriptive purposes, the picture and the image may be used interchangeably. Further, the user is able to instruct the service providing system 1 to print any number of pictures.

At the event hall, the user captures one or more pictures with the image capturing device 20, and posts the captured pictures on the SNS service 60 while assigning a hash tag to each picture (S1). The hash tag is a character string, which is arbitrarily assigned to reflect a content of the picture or a content related to the picture. For example, a hash tag indicating a specific event may be assigned to one or more pictures having a content related to such event. For example, on the SNS service 60, the pictures posted by different users participating in the same event, or the pictures posted by different users who share the common experiences or tastes, will be associated with one another with the hash tags.

In this embodiment, it is assumed that the user posts the pictures each assigned with the hash tag, on the SNS service 60, using the image capturing device 20. Alternatively, the user may post the pictures at a specific page to be displayed by the SNS service 60, using the image capturing device 20.

In such case, the pictures posted through the SNS service 60 will be associated with one another, with page identification information (such as a page ID).

Next, the user requests the service providing apparatus 10, placed at the event hall, for a print service to print one or more pictures posted on the SNS service 60 (S2).

The service providing apparatus 10 sends a request for a list of pictures posted on the SNS service 60, each assigned with a specific hash tag (S3). The specific hash tag is a character string indicating the specific event that the user is participating, that is, the specific event that the user takes a picture. In response to that request, the service providing apparatus 10 receives the list of pictures each assigned with the specific tag from the SNS service 60.

The service providing apparatus 10 controls the printer 30 to print one or more pictures, which are selected by the user from the list of pictures (S4). The service providing apparatus 10 further controls the projector 40 or the digital signage 50 to display the selected pictures that have been printed (S5-1, S5-2).

As described above, the service providing apparatus 10, which is provided at an event hall for a specific event, is able to control the printer 30 to print one or more pictures that the user has posted on the SNS service 60 for such specific event while assigning the hash tag for such event.

The service providing apparatus 10 further displays the pictures, printed with the printer 30, with the projector 40 or the digital signage 50. Since the pictures that have been printed are displayed through the projector 40 or the digital signage 50, visitors participating in the event are able to know that the pictures can be printed using the service providing apparatus 10 and the printer 30.

This encourages the visitors participating the event to print more pictures relating to the event, using the service providing apparatus 10 and the printer 30 in the service providing system 1.

Since displaying the printed pictures on a screen by the projector 40 or on a display by the digital signage 50 are performed in a substantially similar manner, for simplicity, the following describes the example case in which the pictures are displayed with the projector 40.

Next, hardware configurations of the service providing apparatus 10 and the image capturing device 20 are described according to the embodiment.

Figure 3:
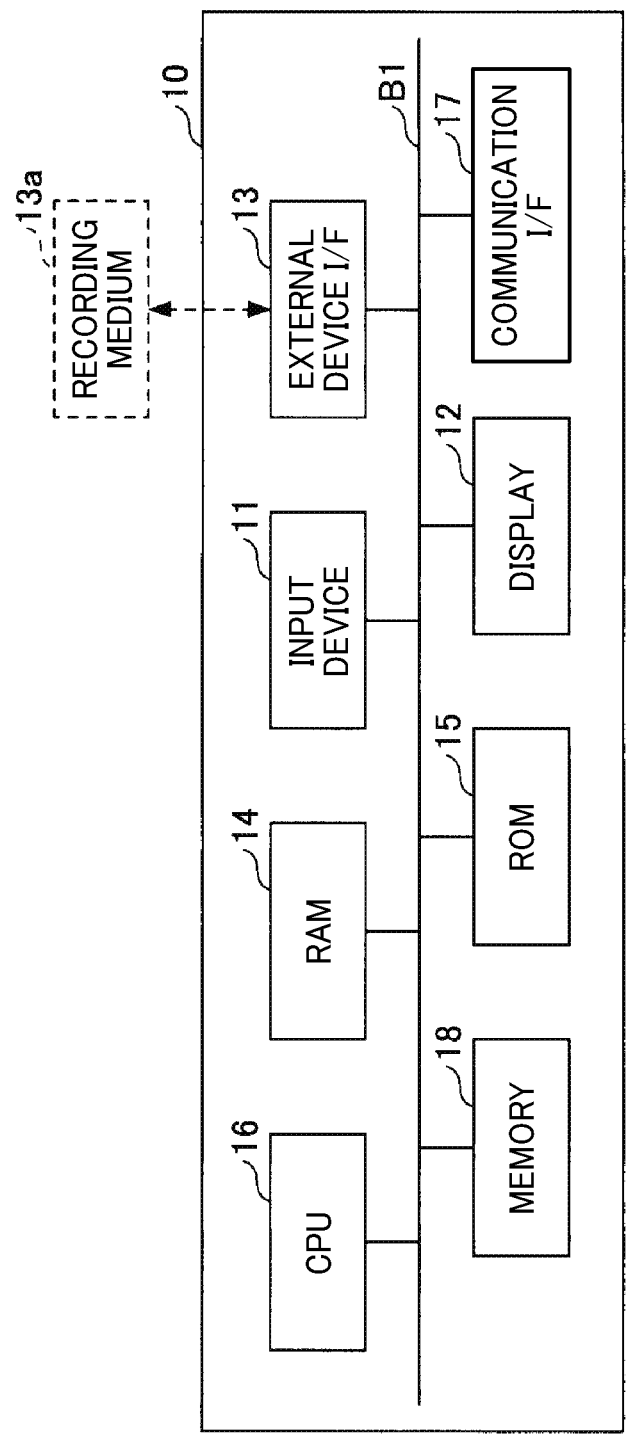
FIG. 3 is a schematic diagram illustrating a hardware configuration of the service providing system illustrated in FIG. 1 according to the first embodiment.

Referring to FIG. 3, a hardware configuration of the service providing apparatus 10 is described according to the embodiment. FIG. 3 is a schematic diagram illustrating a hardware configuration of the service providing apparatus 10 according to the first embodiment.

The service providing apparatus 10 illustrated in FIG. 3 includes an input device 11, a display 12, an external device interface (I/F) 13, and a random access memory (RAM) 14. The service providing apparatus 10 further includes a read only memory (ROM) 15, a central processing unit (CPU) 16, a communication I/F 17, and a memory 18. These hardware elements are connected with each other through a bus B1.

The input device 11 receives a user instruction such as a user input, and implemented by, for example, a touch panel. Alternatively, the input device 11 may be implemented by a keyboard or a mouse. The display 12 displays a result of processing by the service providing apparatus 10, for example, to the user.

The communication I/F 17 is an interface that connects the service providing apparatus 10 to the network N, and implemented by, for example, a network interface card (NIC). With the communication I/F 17, the service providing apparatus 10 is able to communicate with the other device via the network N.

The memory 18 is, for example, a hard disk drive (HDD) that stores programs and data. Examples of programs and data stored in the memory 18 include, but not limited to, operating system (OS) for controlling operation of the service providing apparatus 10, and application software that provides various types of function under control of the OS.

Alternatively, the memory 18 of the service providing apparatus 10 may be implemented by a solid state drive (SSD) that uses a flash memory as a storage area. The programs and data stored in the memory 18 may be managed using a file system or database.

The external device I/F 13 is an interface with the external device, such as a recording medium 13a, and is implemented by such as a USB port. With the external device I/F 13, the service providing apparatus 10 is able to read or write with respect to the recording medium 13a. The recording medium 13a may be any type of removable memory, such as flexible disk, CD, DVD, SD memory card, and USB memory.

The ROM 15 is a non-volatile semiconductor memory, which keeps storing programs or data even after the power is turned off. More specifically, the ROM 15 stores basic input/output system (BIOS) to be executed at the start up of the service providing apparatus 10, OS configuration data, and network configuration data. The RAM 14 is a volatile semiconductor memory, which temporarily stores programs or data.

The CPU 16 is a processor that controls entire operation of the service providing apparatus 10. More specifically, the CPU 16 controls hardware of the service providing apparatus 10 (illustrated in FIG. 3) according to the program and data, which is read from the ROM 15 or the memory 18 onto the RAM 14, to achieve various functions to be described below.

Figure 4:
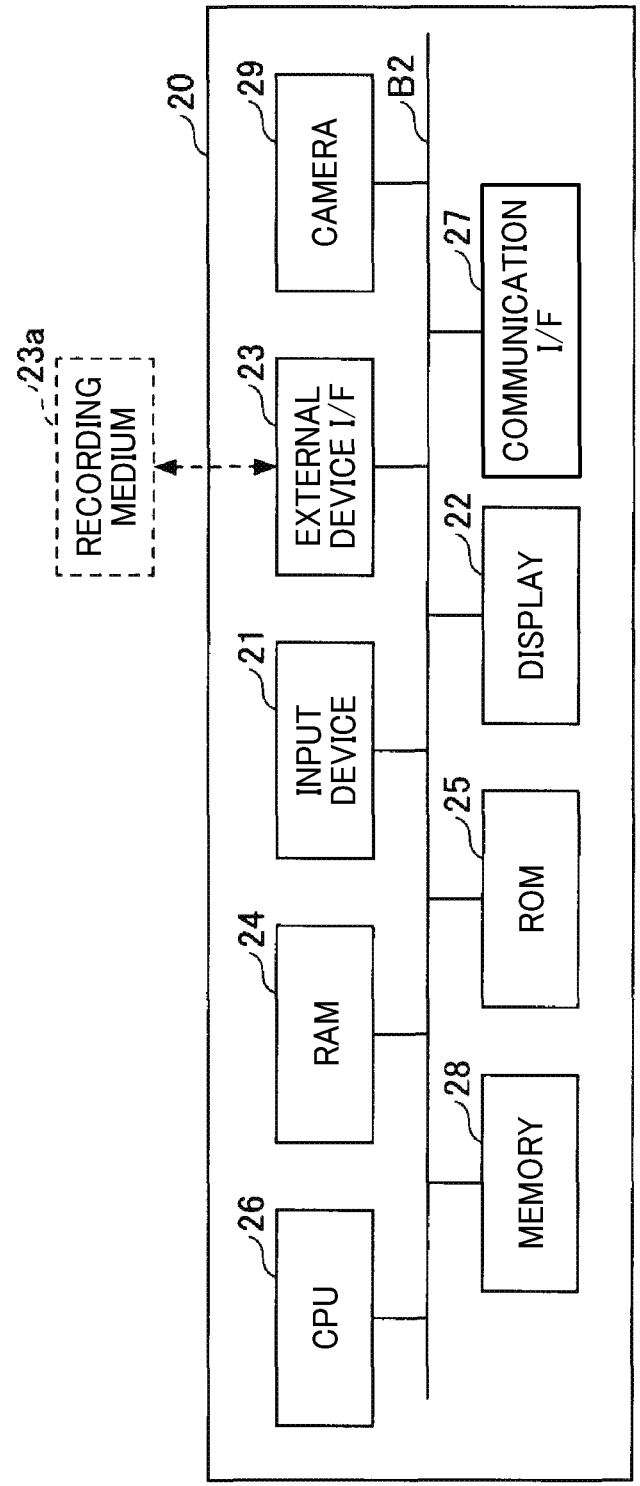
FIG. 4 is a schematic diagram illustrating a hardware configuration of an image capturing device according to the first embodiment.

Referring to FIG. 4, a hardware configuration of the image capturing device 20 is described, in the example case where the image capturing device 20 is a smart phone or a tablet. FIG. 4 is a schematic diagram illustrating a hardware configuration of the image capturing device 20 according to the first embodiment.

The image capturing device 20 illustrated in FIG. 4 includes an input device 21, a display 22, an external device interface (I/F) 23, and a random access memory (RAM) 24. The image capturing device 20 further includes a read only memory (ROM) 25, a central processing unit (CPU) 26, a communication I/F 27, a memory 28, and a camera 29. These hardware elements are connected with each other through a bus B2.

The input device 21 receives a user instruction such as a user input, and implemented by, for example, a touch panel. Alternatively, the input device 21 may be implemented by a keyboard or a mouse, for example, in case the image capturing device 20 is implemented by a general-purpose PC. Alternatively, the input device 21 may be implemented by a microphone, which captures user's voice. The display 22 displays a result of processing by the image capturing device 20 to the user.

The communication I/F 27 is an interface that connects the image capturing device 20 to the network N, and implemented by, for example, a network interface card (NIC). With the communication I/F 27, the image capturing device 20 is able to communicate with the other device via the network N.

The memory 28 is, for example, a SSD that stores programs and data. Examples of programs and data stored in the memory 28 include, but not limited to, operating system (OS) for controlling operation of the image capturing device 20, and application software that provides various types of function under control of the OS.

The external device I/F 23 is an interface with the external device, such as a recording medium 23a, and is implemented by such as a USB port. With the external device I/F 23, the image capturing device 20 is able to read or write with respect to the recording medium 23a. The recording medium 23a may be any type of removable memory, such as SD memory card, and USB memory.

The ROM 25 is a non-volatile semiconductor memory, which keeps storing programs or data even after the power is turned off. More specifically, the ROM 25 stores, as the programs and data, OS configuration data and network configuration data. The RAM 24 is a volatile semiconductor memory, which temporarily stores programs or data.

The CPU 26 is a processor that controls entire operation of the image capturing device 20. More specifically, the CPU 26 controls hardware of the image capturing device 20 (illustrated in FIG. 4) according to the program and data, which is read from the ROM 25 or the memory 28 onto the RAM 24, to achieve various functions to be described below. The camera 29 captures an object, in an image capturing area, to generate image data.

The image capturing device 20 performs various functions described below, using hardware illustrated in FIG. 4 according to the control programs.

Figure 5:
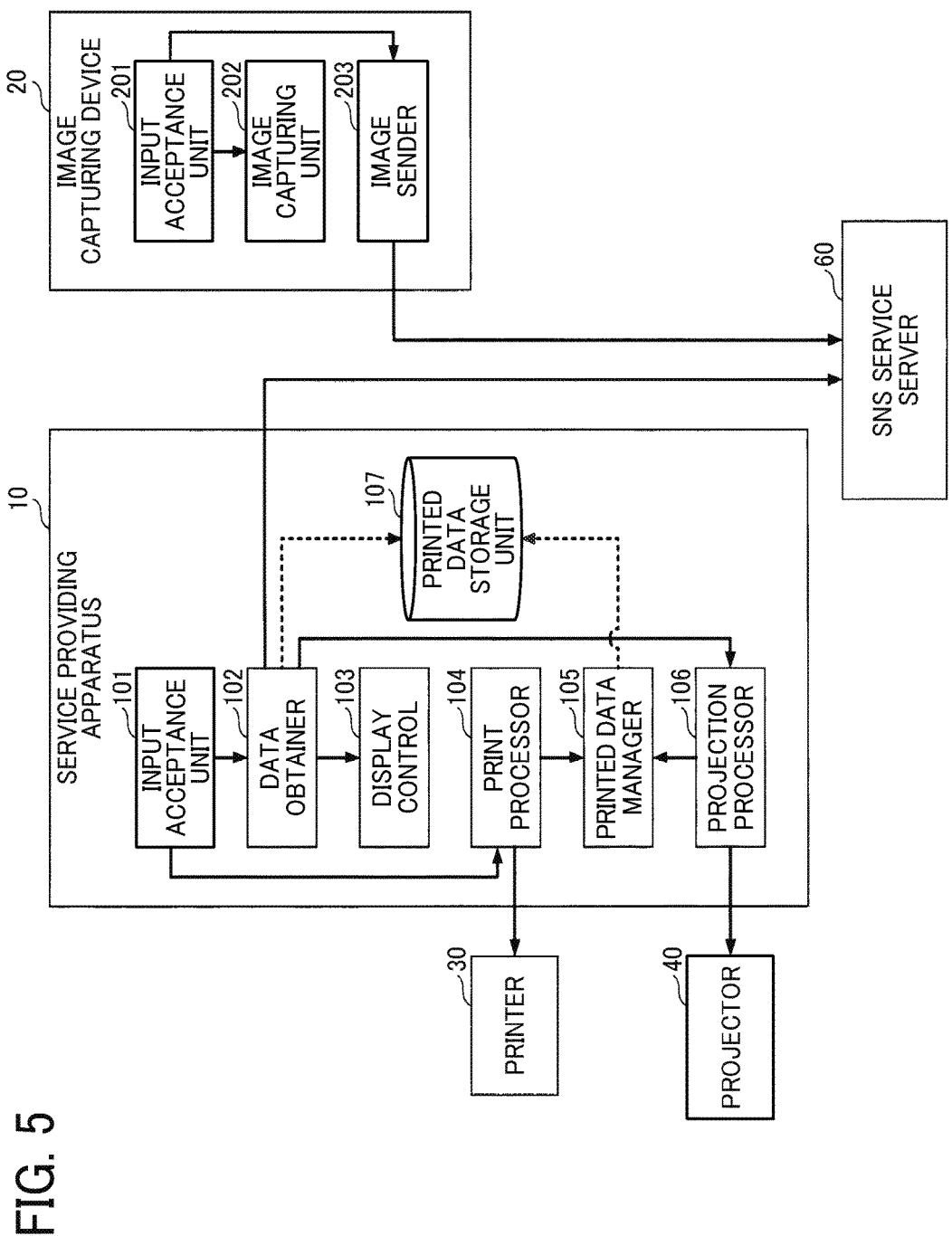
FIG. 5 is a schematic diagram illustrating a functional configuration of the service providing system illustrated in FIG. 1 according to the first embodiment.

Referring now to FIG. 5, a functional configuration of the service providing system 1 is described according to the embodiment, FIG. 5 is a schematic diagram illustrating a functional configuration of the service providing system 1 according to the first embodiment.

As illustrated in FIG. 5, the service providing apparatus 10 includes an input acceptance unit 101, a data obtainer 102, a display control 103, a print processor 104, a printed data manager 105, and a projection processor 106. These functional elements are achieved by a set of instructions, issued by the CPU 16 according to software programs on the service providing apparatus 10.

The service providing apparatus 10 further includes a printed data storage unit 107. The printed data storage unit 107 may be implemented by the memory 18, or any desired memory connected to the service providing apparatus 10 via the network N.

The input acceptance unit 101 receives various instructions from the user. For example, the input acceptance unit 101 receives a user instruction to start operation of printing one or more pictures posted on the SNS service 60. In another example, the input acceptance unit 101 receives a user instruction to select one or more of the list of pictures, which is displayed by the display control 103, as the pictures to be printed.

The data obtainer 102 obtains various types of data from the SNS service 60. For example, in response to the user instruction for starting the print service received at the input acceptance unit 101, the data obtainer 102 obtains the list of pictures each assigned with a specific hash tag, from the SNS service 60. In another example, in response to the user instruction for selecting one or more pictures to be printed, the data obtainer 102 obtains data of the selected pictures from the SNS service 60.

The display control 103 controls any desired display, such as the display 12, to display various types of screens. For example, the display control 103 controls the display 12 to display a list of pictures obtained by the data obtainer 102. In another example, the display control 103 controls the display 12 to display a print preview screen for one or more pictures that are selected for print.

When the input acceptance unit 101 receives a user instruction for printing the selected pictures, for each selected picture, the print processor 104 edits the selected picture such as by adding a frame to the selected picture. The print processor 104 further sends a print request for printing the selected pictures, which are edited, to the printer 30. In response to the print request, the printer 30 prints the pictures selected by the user.

The printed data manager 105 manages information regarding the pictures printed with the printer 30, as printed data information. For example, in response to the print request from the print processor 104, the printed data manager 105 stores, in the printed data storage unit 107, a uniform resource locater (URL) indicating an address where the picture that has been printed is stored, as the printed data information.

The projection processor 106 transmits to the projector 40 a projection request for projecting the pictures that have been printed with the printer 30, based on the printed data information managed with the printed data manager 105. The projector 40 projects, on a screen, the pictures that have been printed with the printer 30.

Figure 6:
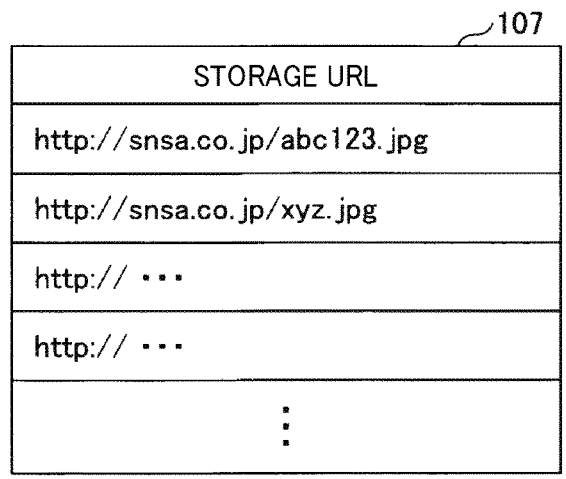
FIG. 6 is an example data structure of printed data information according to the first embodiment.

The printed data storage unit 107 stores therein the printed data information. Referring to FIG. 6, the printed data information stored in the printed data storage unit 107 is described according to the embodiment. FIG. 6 is an example data structure of printed data information according to the first embodiment.

As illustrated in FIG. 6, the printed data storage unit 107 stores, for each picture that has been printed with the printer 30, a storage URL (that is, the URL on the SNS service 60) where data of the picture is stored. The storage URLs may be stored in the form of a table, for example.

Referring back to FIG. 5, the image capturing device 20 includes an input acceptance unit 201, an image capturing unit 202, and an image sender 203. These functional elements are achieved by a set of instructions, issued by the CPU 26 according to software programs on the image capturing device 20.

The input acceptance unit 201 receives various instructions from the user. For example, the input acceptance unit 201 receives a user instruction for capturing one or more pictures. In another example, the input acceptance unit 201 receives a user instruction for posting the captured pictures on the SNS service 60.

In response to the user instruction for capturing the pictures at the input acceptance unit 201, the image capturing unit 202 captures the pictures using the camera 29 to generate the image data of the captured pictures.

In response to the user instruction for posting the pictures at the input acceptance unit 201, for each picture, the image sender 203 assigns a hash tag to the image data captured with the image capturing unit 202. The image sender 203 further posts (uploads) the image data of the pictures to the SNS service 60 on the network N. The hash tag may be input or selected by the user.

Next, operation of the service providing system 1 is described according to the embodiment.

Figure 7:
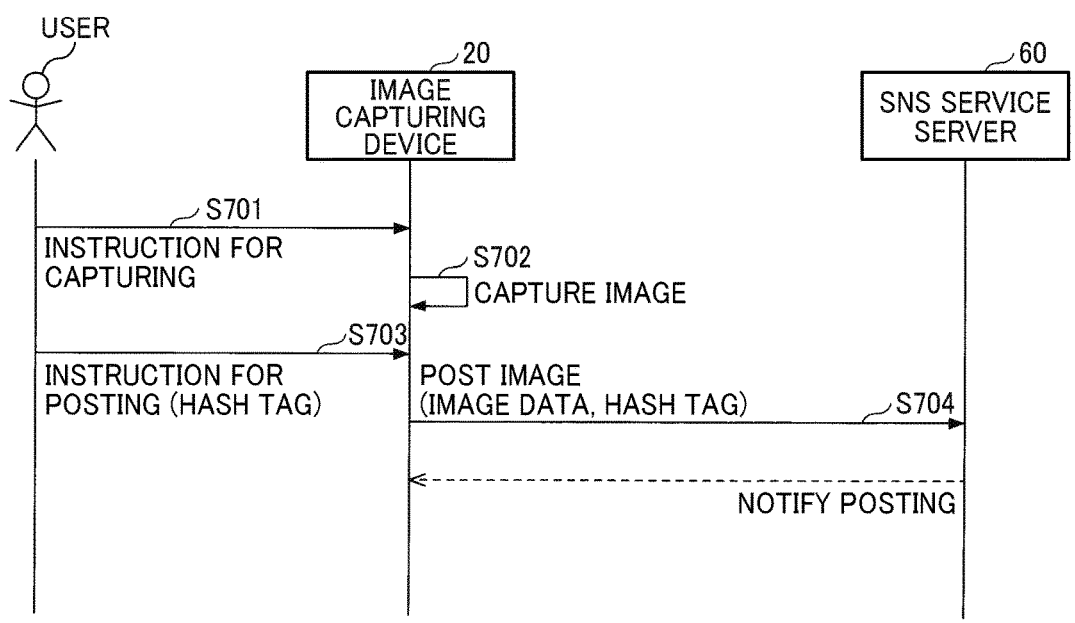
FIG. 7 is a data sequence diagram illustrating operation of capturing images and storing the captured images, performed by the service providing system of FIG. 5, according to the first embodiment.

First, referring to FIG. 7, operation of capturing one or more pictures and posting (that is, storing) the captured pictures on the SNS service 60 is described. FIG. 7 is a data sequence diagram illustrating operation of capturing one or more pictures and storing (that is, posting) the pictures on the SINS service 60, according to the embodiment.

The user activates the camera 29 of the image capturing device 20 to prepare for capturing a picture. In response to a user operation (such as pressing of a key on the image capturing device 20), the input acceptance unit 201 of the image capturing device 20 receives the user instruction for capturing one or more pictures (S701).

The image capturing unit 202 of the image capturing device 20 captures one or more pictures of an object using the camera 29 to generate image data (S702). The captured images are stored in a local memory of the image capturing device 20.

The user, who logs in the SNS service 60, inputs or selects a hash tag to be assigned to the image data generated with the image capturing unit 202, and instructs to post one or more pictures that are taken by the user on the SNS service 60. In addition to the hash tag, the image capturing device 20 may automatically assign a character string that helps to identify a user of the image capturing device 20, such as an ID of the image capturing device 20, and an ID for identifying each picture such a randomly assigned number. The input acceptance unit 201 of the image capturing device 20 receives the user instruction for posting the pictures each assigned with the hash tag (S703).

In this embodiment, the user inputs or selects a hash tag, which is previously determined by, for example, an organizer or a sponsor of the event that the user is participating. The event that the user is participating is an event held at a location where the service providing apparatus 10 and the printer 30 are provided. More specifically, the user is informed of such hash tag to be assigned for posting on the SNS service 60, from a publication for that event. Examples of the publication include, but not limited to, a poster, flayer, and web page related to that event, which may be available at the event hall.

The image sender 203 of the image capturing device 20 assigns the hash tag, input or selected by the user, to the image data generated with the image capturing unit 202, and posts that image data of one or more pictures on the SNS service 60 (S704). In response, the SNS service server 60 may send a notification indicating completion of posting of the image data.

As described above, pictures (images) that have been captured at the event hall or the shopping mall, or any other area where the service providing apparatus 10 and the printer 30 are provided, are each assigned with a specific hash tag and posted on the SNS service 60.

Figure 8:
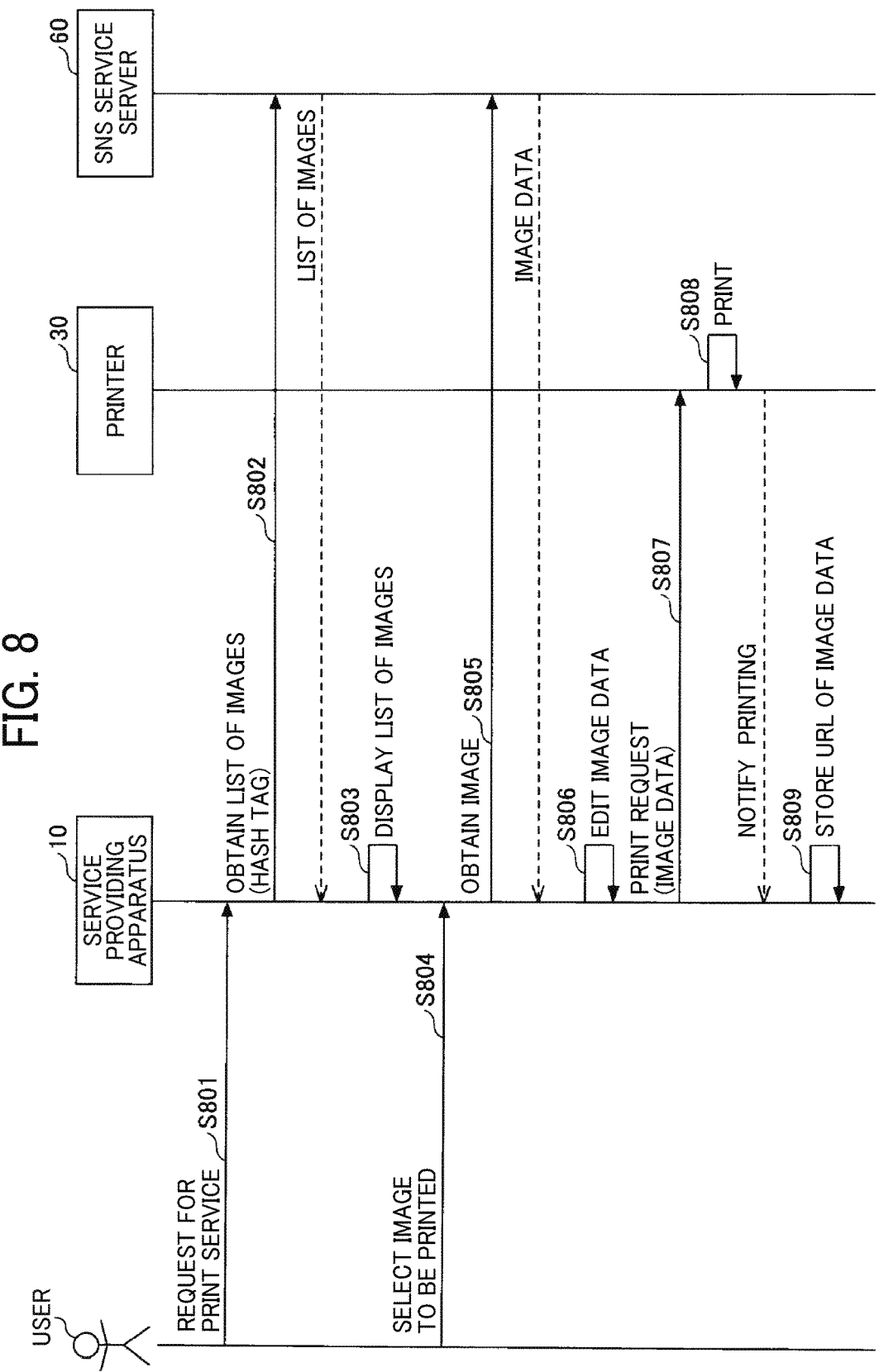
FIG. 8 is a data sequence diagram illustrating operation of printing images, performed by the service proving system of FIG. 5, according to the first embodiment.

Next, referring to FIG. 8, operation of printing one or more pictures that are posted on the SNS service 60, using the service providing apparatus 10, is described according to the embodiment. FIG. 8 is a data sequence diagram illustrating operation of printing one or more pictures posted on the SNS service 60, according to the first embodiment.

First, the user operates the input device 11 of the service providing apparatus 10 to request for a print service to print one or more pictures posted on the SNS service 60. The input acceptance unit 101 of the service providing apparatus 10 receives a user request for print service (S801). The user request may include authentication information of the user such as the ID of the image capturing device 20, or authentication information to be used in logging in a user's page on the SNS service 60.

In response to the instruction for print service that is received at the input acceptance unit 101, the data obtainer 102 of the service providing apparatus 10 transmits a request for obtaining a list of pictures each assigned with a specific hash tag, to the SNS service 60 (S802). In response, the SNS service 60 transmits a list of pictures each assigned with the specific hash tag, to the service providing apparatus 10 through the network N.

More specifically, the data obtainer 102 transmits a request with a specific hash tag, using a web application programming interface (Web API) that is published by the SNS service 60, to obtain a list of pictures.

In this embodiment, the list of pictures assigned with the specific hash tag is a list of storage URLs each indicating a storage area where the image data of the picture is stored. The hash tag to be sent with the request for a list of pictures may be previously set, for example, by an event staff of the event when the service providing apparatus 10 is installed at the event hall.

Figure 9:
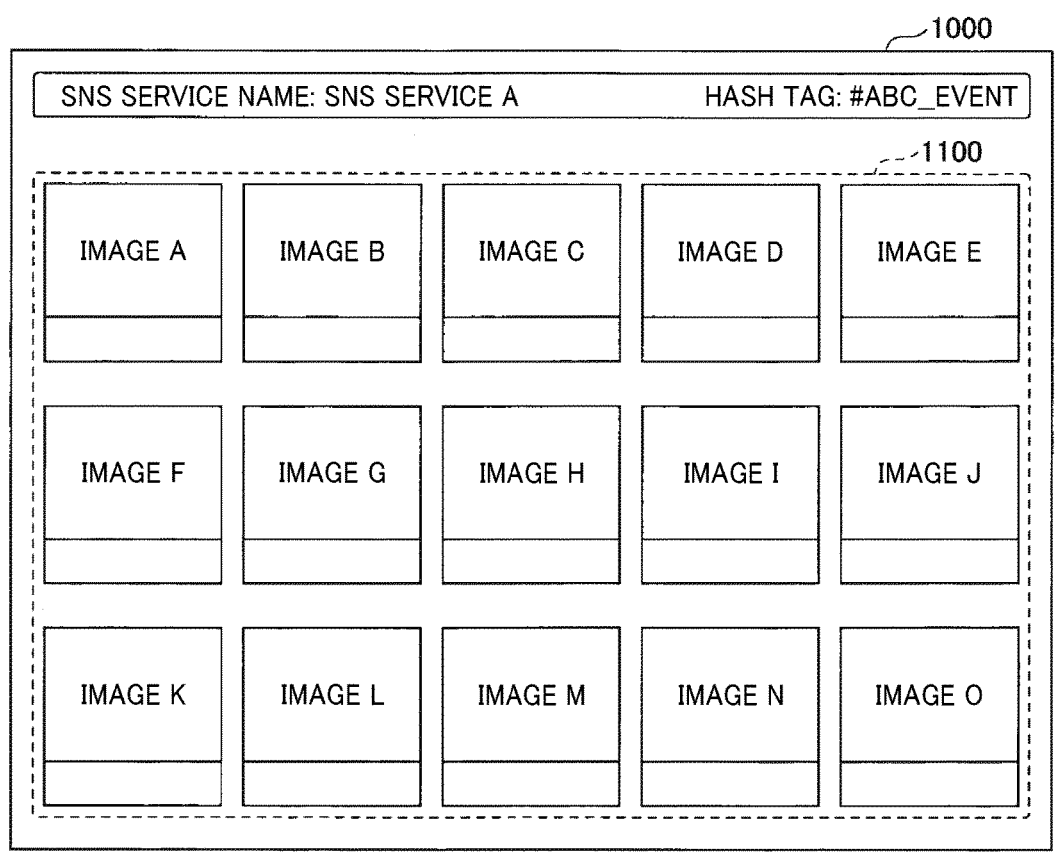
FIG. 9 is an illustration of an example list screen.

In response to obtaining the list of pictures at the data obtainer 102, the display control 103 of the service providing apparatus 10 controls the display 12 to display a list screen 1000 as illustrated in FIG. 9 (S803).

The list screen 1000 of FIG. 9 includes a picture list 1100, which lists a plurality of pictures (images) each assigned with the hash tag "#ABC_EVENT". Through the picture list 1100 being displayed, as described below, the user is able to select one or more pictures for printing with the printer 30, for example, with the input device 11 of the service providing apparatus 10.

In this embodiment, the display control 103 may refer to attribute information (such as Exif data) of the image data identified with the storage URL, to extract only those images satisfying a certain condition for display on the picture list 1100. For example, the display control 103 may control to display only those images, each satisfying that location information of Exif data indicates an area within a certain area. This eliminates images not captured within the certain area, thus only displaying those images captured within the certain area. For example, the certain area may be an area within a certain distance from the location where the service providing apparatus 10 (and the printer 30) is provided. In another example, the display control 103 may control to display those images, each satisfying that date and time information of Exif data indicates a certain date and time. This eliminates images not captured at the certain date and time, thus only displaying those images captured at the certain date and time. For example, the certain date and time may be a date and time within a certain range from the date and time when the user sends the instruction to the service providing apparatus 10.

Since a number of images to be displayed on the picture list 1100 can be reduced, the user may easily select one or more images for printing.

From the picture list 1100 being displayed, the user selects one or more images for printing and instructs the service providing apparatus 10 to print the selected images. The input acceptance unit 101 of the service providing apparatus 10 receives the instruction for printing the selected images (S804).

Figure 10A:
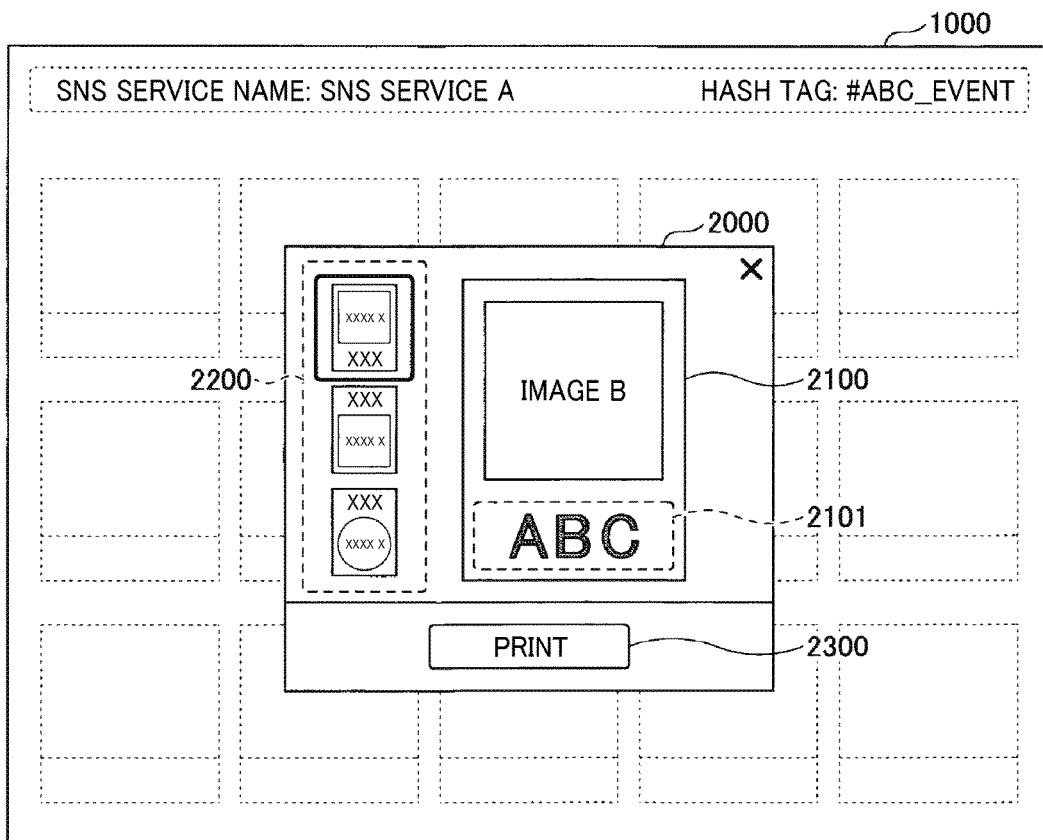
FIGS. 10A and 10B (FIG. 10) are an illustration of an example print preview screen.

In response to the instruction for printing the selected images, the display control 103 of the service providing apparatus 10 controls the display 12 to additionally display, for example, a print preview window 2000 illustrated in FIG. 10A.

Figure 10B:
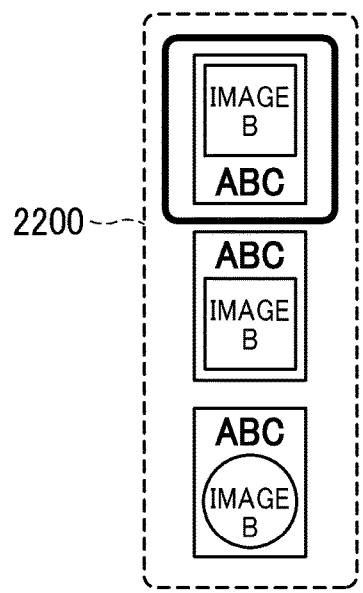

The print preview window 2000 of FIG. 10A is a screen displayed, when the user selects the "image B" from the picture list 1100 in the list screen 1000 of FIG. 9. The print preview screen 2000 illustrated in FIG. 10A includes a preview image 2100, a frame list 2200 (FIG. 10B), and a print key 2300.

The preview image 2100 is a preview of the selected picture when printed. More specifically, in response to selection of a frame by the user from the frame list 2200, the preview image 2100 displays a preview of the selected picture on the selected frame. The preview image 2100 further includes an advisement logo 2101, which may include a name of an organizer or a sponsor of the event.

Through displaying the advisement logo 2101 on the frame selected by the user, the organizer or the sponsor of the event is able to promote companies or their products supporting the event.

The print preview screen 2000 of FIG. 10A allows the user to select any desired frame to be used. Alternatively, the frame may be previously set by default. Further, through the print preview screen 2000, the user may select an image editing filter, to apply various effects such as monochrome, sepia, and color splash effects.

In this embodiment, the user is able to instruct the printer 30 to print the selected image, by pressing the print key 2300 on the print preview screen 2000 illustrated in FIG. 10A.

In response to a print request at the input acceptance unit 101, the data obtainer 102 of the service providing apparatus 10 transmits a request for obtaining image data of the selected picture to the SNS service 60 (S805). In response to the data obtaining request, the SNS service 60 transmits the image data of the selected picture to the service providing apparatus 10.

In this embodiment, the data obtainer 102 obtains a storage URI, of the selected image data, from among the list of storage URLs of the image data that is received from the SNS service 60 at S802. Using the obtained storage URL of the selected image data, the data obtainer 102 obtains the image data of the selected image.

Next, the print processor 104 of the service providing apparatus 10 edits the image data of the selected picture, which is obtained at the data obtainer 102 (S806). More specifically, the print processor 104 edits the obtained image data, according to the frame selected from the frame list 2200 on the print preview screen 2000 illustrated in FIG. 10A. For example, the selected frame is superimposed on an image (picture) of the obtained image data, to generate the edited image data.

The print processor 104 of the service providing apparatus 10 transmits a print request for printing the edited image data, to the printer 30 (S807). The edited image data is sent with the print request. In response to the print request, the printer 30 prints the edited image data (S808). The printer 30 may send a notification indicating completion of printing. Accordingly, the printer 30 prints the picture (image) selected by the user, with the selected frame.

In this embodiment, the printer 30 does not only print the picture on paper, such as a sheet for photo printing. Alternatively, the printer 30 may print the picture on any desired material such as on clothing like T-shirt, a sheet material such as a resin material, plastic, copper foil, and pre-preg.

While the printer 30 is printing the image, the service providing apparatus 10 may continuously display, on the display 12, an advisement of an organizer or a sponsor of the event.

The printed data manager 105 of the service providing apparatus 10 stores, in the printed data storage unit 107, the storage URL of the image data that is obtained at S805, as the printed data information (S809). Through performing S809, the service providing apparatus 10 is able to manage storage URLs of the pictures that have been printed with the printer 30.

Through the above-described operation, the printer 30 prints pictures (images) that have been captured at, for example, the event hall or the shopping mall. More specifically, the service providing apparatus 1 allows the user to print one or more pictures that the user has captured with the image capturing device 20 and posted on the SNS service 60 for a specific event while assigning the hash tag for such event.

The user is thus able to have pictures for the event that the user has participated, as a part of memories. On the other hand, the organizer or sponsor of the event is able to promote company products or companies, through adding advisement on a frame of the picture to be printed by the user.

Referring to FIG. 11, operation of projecting the images printed with the printer 30, using the projector 40, is described according to the embodiment. FIG. 11 is a data sequence diagram illustrating operation of projecting the images according to the first embodiment.

The data obtainer 102 of the service providing apparatus 10 obtains the printed data information (that is, the storage URLs of the printed images), from the printed data storage unit 107 (S1101). The data obtainer 102 may obtain printed data information indicating one picture, or print data information indicating a plurality of pictures, from the printed data storage unit 107. For simplicity, in the following, it is assumed that more than one picture that has been printed are projected.

The data obtainer 102 of the service providing apparatus 10 transmits a request for obtaining the image data indicated by the storage URLs that are obtained at S1101, to the SNS service 60 (S1102). In response to such request, the SNS service 60 transmits the image data indicated by the storage URLs, which are the image data of the pictures that have been printed.

The projection processor 106 of the service providing apparatus 10 transmits a projection request for projecting the image data of the pictures, obtained in response to the request at S1102, to the projector 40 (S1103). In response to the projection request, the projector 40 projects, on a screen, the printed pictures that are obtained from the projection request (S1104). The projector 40 may further send a notification indicating completion of projection of the images. Accordingly, the projector 40 projects, on the screen, the pictures that have been printed with the printer 30.

After the projection request is transmitted from the projection processor 106, the printed data manager 105 may delete the printed data information from the printed data storage unit 107, which corresponds to the image data of the printed pictures that has been sent with the projection request.

In case the service providing apparatus 10 receives image data of a plurality of images from the SNS service 60 at S1102, the service providing apparatus 10 may combine the images into one image data for projection, and transmit such combined image data to the projector 40.

The operation of FIG. 11, which includes S1101 to S1104, may be performed every predetermined time period. Through performing operation of FIG. 11, the pictures that have been printed with the printer 30 are projected (or displayed) on a screen (or display) at the event hall or the shopping mall.

As described above, the visitors at the event or shopping mall can see the pictures (images) displayed on the projector 40 or the digital signage 50, and know that the pictures can be printed using the service providing apparatus 10 and the printer 30. This encourages the visitors participating the event to print more pictures relating to the event, using the service providing apparatus 10 and the printer 30 in the service providing system 1.

In the above-described embodiment, the projector 40 only projects the pictures (images) that have been printed with the printer 30. However, the projector 40 is capable of displaying the pictures, which have not been printed with the printer 30.

In the above-described embodiment, the service providing apparatus 10 transmits a projection request to the projector 40 at S1103. However, operation of projecting the images may be performed in various other ways. For example, the projector 40 may transmit a request for obtaining image data for projection, to the service providing apparatus 10, every predetermined time period. More specifically, the projector 40 may transmit a hypertext transfer protocol (HTTP) request to the service providing apparatus 10 operating as the web server. In such case, the projector 40 projects the images of image data, which are obtained in response to such data obtaining request, at S1104.

Figure 12:
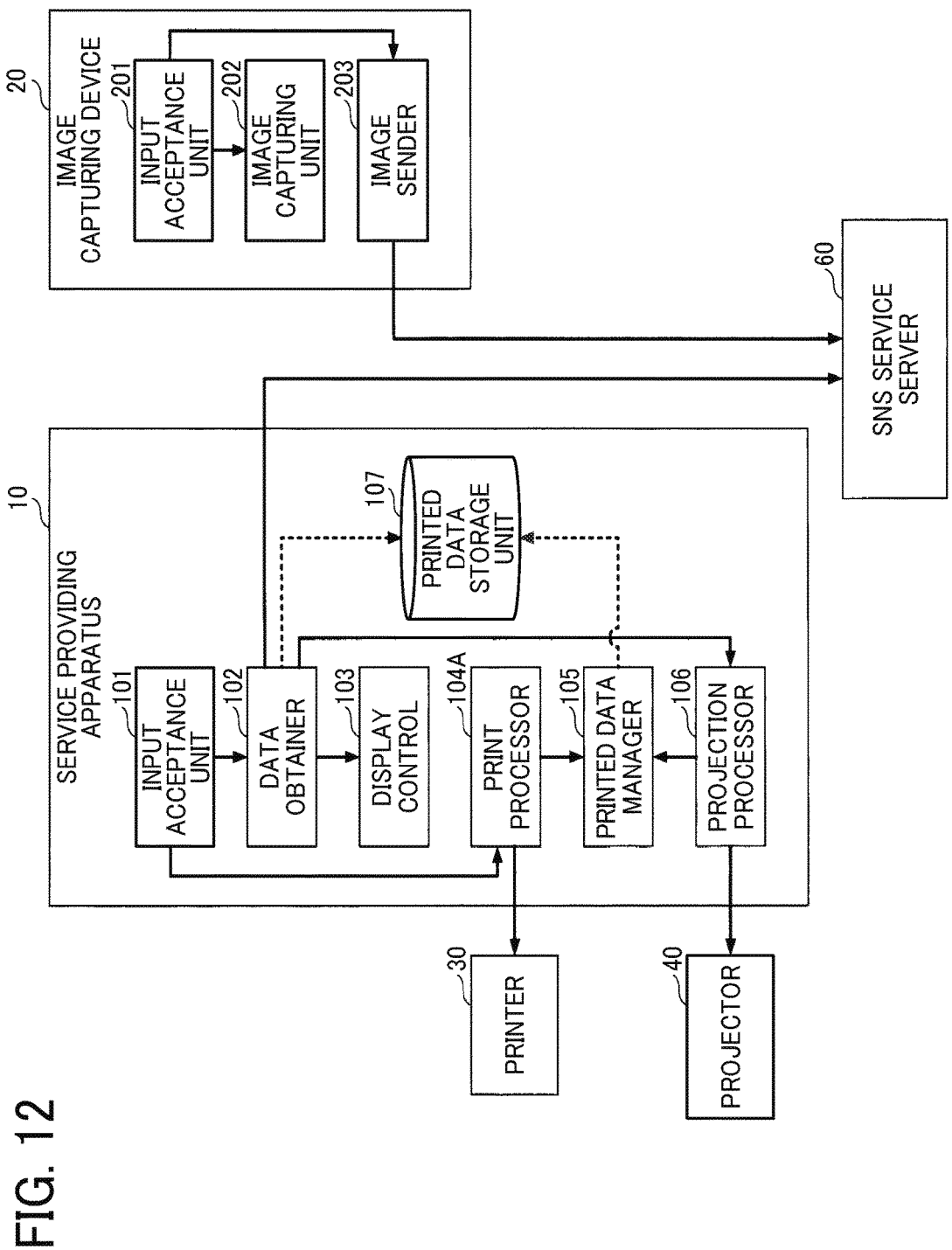
FIG. 12 is a schematic diagram illustrating a functional configuration of a service providing system according to a second embodiment.
Figure 13:
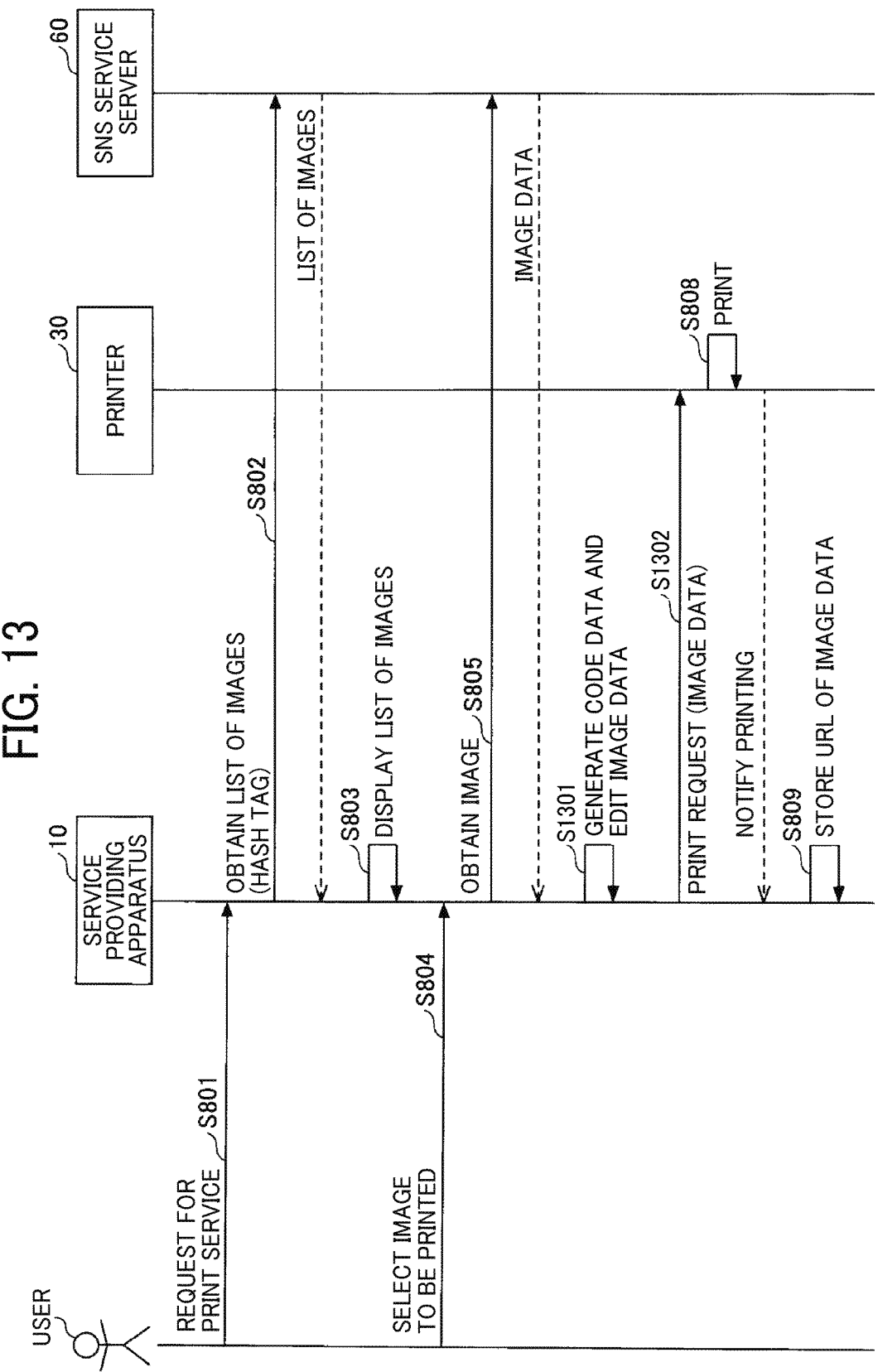
FIG. 13 is a data sequence diagram illustrating operation of printing images, performed by the service providing system of FIG. 12, according to the second embodiment.
Figure 14:
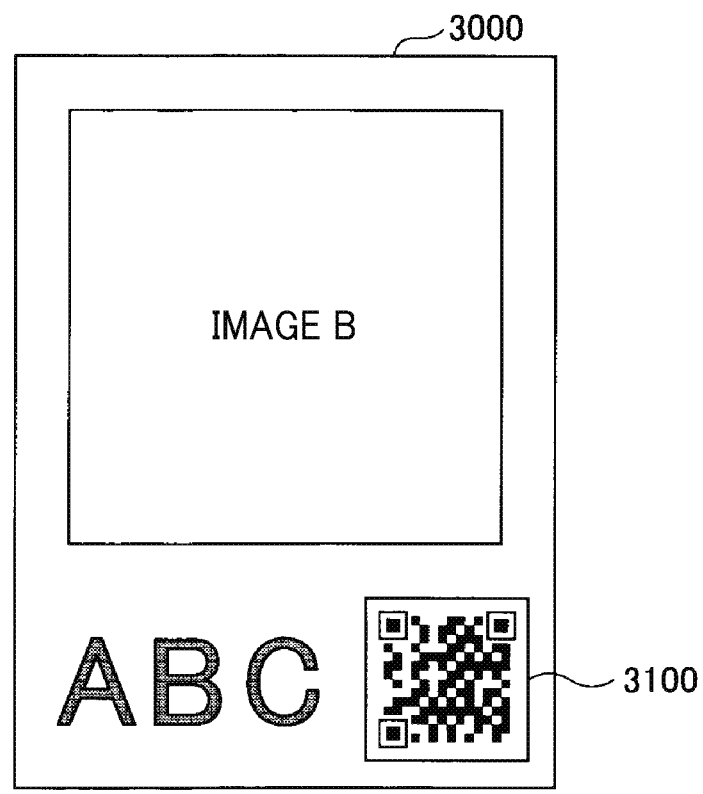
FIG. 14 is an illustration of an example printed material added with code information.

Referring to FIGS. 12 to 14, the service providing system 1 is described according to a second embodiment. In the second embodiment, code information such as a QR code (Registered Trademark) is added to a printed matter.

Referring now to FIG. 12, a functional configuration of the service providing system 1 is described according to the second embodiment. FIG. 12 is a schematic diagram illustrating a functional configuration of the service providing system 1 according to the second embodiment.

As illustrated in FIG. 12, the service providing apparatus 10 of FIG. 12 is substantially similar to the service providing apparatus 10 of FIG. 5, except for replacement of the print processor 104 with a print processor 104A. The print processor 104A further generates code information, such as a QR code, in response to a print request received at the input acceptance unit 101. The print processor 104A adds the code information to the picture (image) selected by the user for printing, and transmits the print request for printing the selected picture with the code information to the printer 30. Accordingly, the printer 30 prints the picture on a sheet, while adding the code information such as the QR code.

Next, operation of the service providing system 1 is described according to the second embodiment. FIG. 13 is a data sequence diagram illustrating operation of printing one or more pictures posted on the SNS service 60, performed by the service providing system 1 of FIG. 12, according to the second embodiment. S801 to S805 are performed in a substantially similar as described above referring to FIG. 8.

After the image data is obtained at the data obtainer 102, the print processor 104A of the service providing apparatus 10 generates code information, which is to be added to the image data of one or more pictures that is obtained. The print processor 104 edits the obtained image data, according to the frame selected from the frame list 2200 on the print preview screen 2000 illustrated in FIG. 10A. The print processor 104A further adds the generated code information to the edited image data (S1301).

In this embodiment, the code information to be added to the image data is not limited to a QR code, but may be a SR code or a bar code. The code information may alternatively be an image, which enables a user to obtain such as a URL of a specific site using a dedicated application.

The print processor 104A of the service providing apparatus 10 transmits a print request for printing the edited image data added with the coded information, to the printer 30 (S1302). The edited image data is sent with the print request. For example, the printer 30 prints a printed material 3000 as illustrated in FIG. 14.

The printed material 3000 of FIG. 14 is printed with a QR code 3100. Through reading the QR code 3100 with a smart phone or a tablet, the user can access a site indicated by destination information embedded in the QR code 3100, for example.

Examples of destination site include, but not limited to, a webpage that informs a next event with an offer for advance sale of a thicket, and a webpage that introduces goods related to the event. The URL of such webpage may be embedded in the QR code to be added to the printed material.

Other examples of content to be embedded in the QR code include a discount coupon, audio data or video data related to the event, questionnaire, and application form for prize competition.

Through the above-described operation, the printer 30 prints pictures (images) that have been captured at, for example, the event hall or the shopping mall, with the code information. Through reading the code information with such as a smartphone, the user who has printed the image is able to access content related to the event.

Referring to FIGS. 15 to 19, the service providing system 1 is described according to a third embodiment. In the third embodiment, the pictures (images) captured with the image capturing device 20 are stored in the service providing apparatus 10, in alternative to the SNS service 60. For this reasons, the SNS service 60 does not have to be provided in the service providing system 1.

Figure 15:
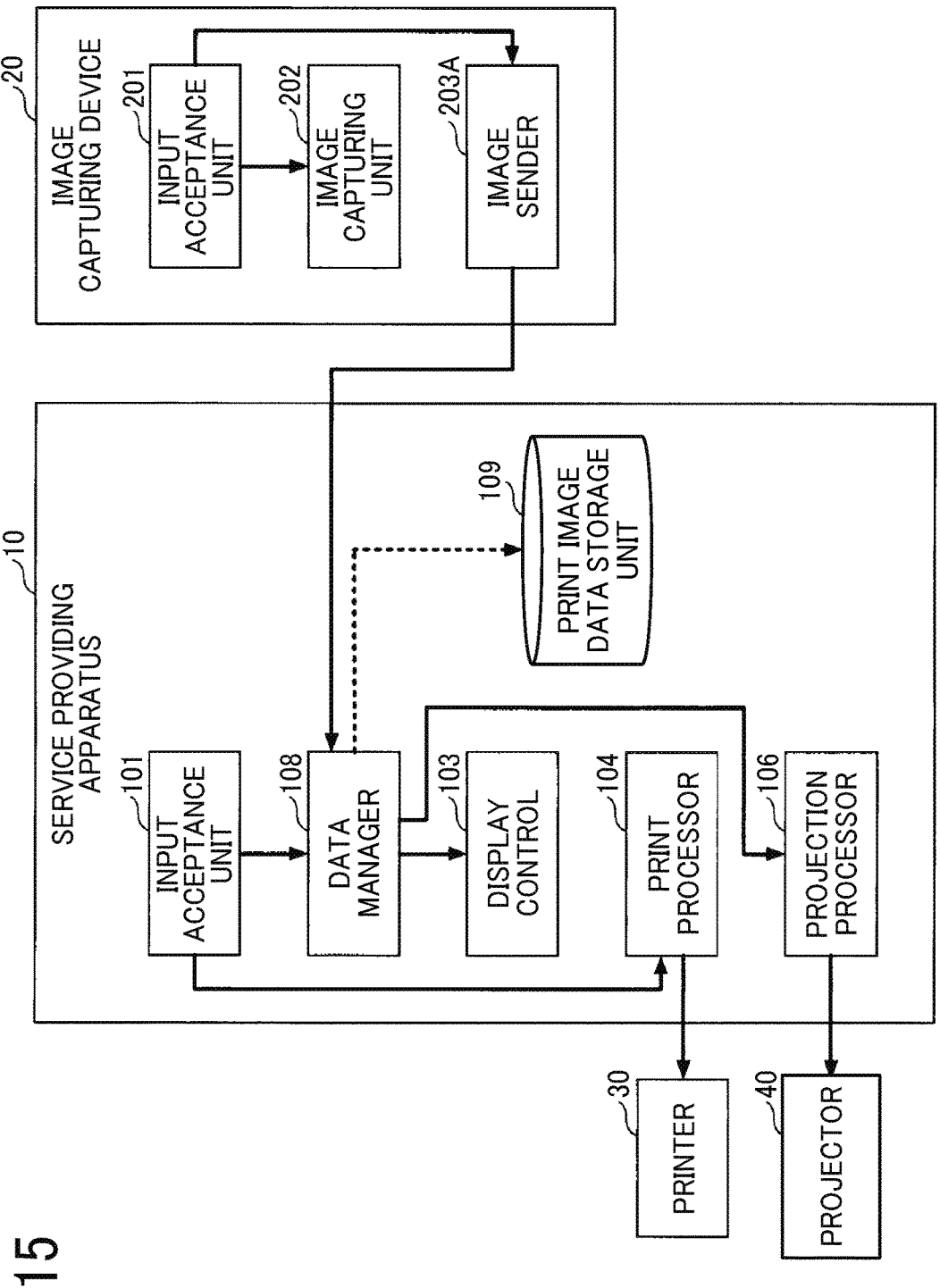
FIG. 15 is a schematic diagram illustrating a functional configuration of a service providing system, according to a third embodiment.

Referring now to FIG. 15, a functional configuration of the service providing system 1 is described according to the third embodiment. FIG. 15 is a schematic diagram illustrating a functional configuration of the service providing system 1 according to the third embodiment.

As illustrated in FIG. 15, the service providing apparatus 10 includes the input acceptance unit 101, the display control 103, the print processor 104, the projection processor 106, and a data manager 108. The function of the data manager 108 is achieved by a set of instructions, issued by the CPU 16 according to software programs on the service providing apparatus 10.

The service providing apparatus 10 further includes a print image data storage unit 109, in alternative to the printed data storage unit 107. The print image data storage unit 109 is implemented by, for example, the memory 18.

The data manager 108 stores the image data of one or more pictures, transmitted from the image capturing device 20, in a storage area of the memory 18. The data manager 108 generates print image information including a storage path indicating a storage area of image data for printing, and stores the generated print image information in the print image data storage unit 109.

The data manager 108 generates a list of images for printing, based on the print image information stored in the print image data storage unit 109.

Figures 16, 17:
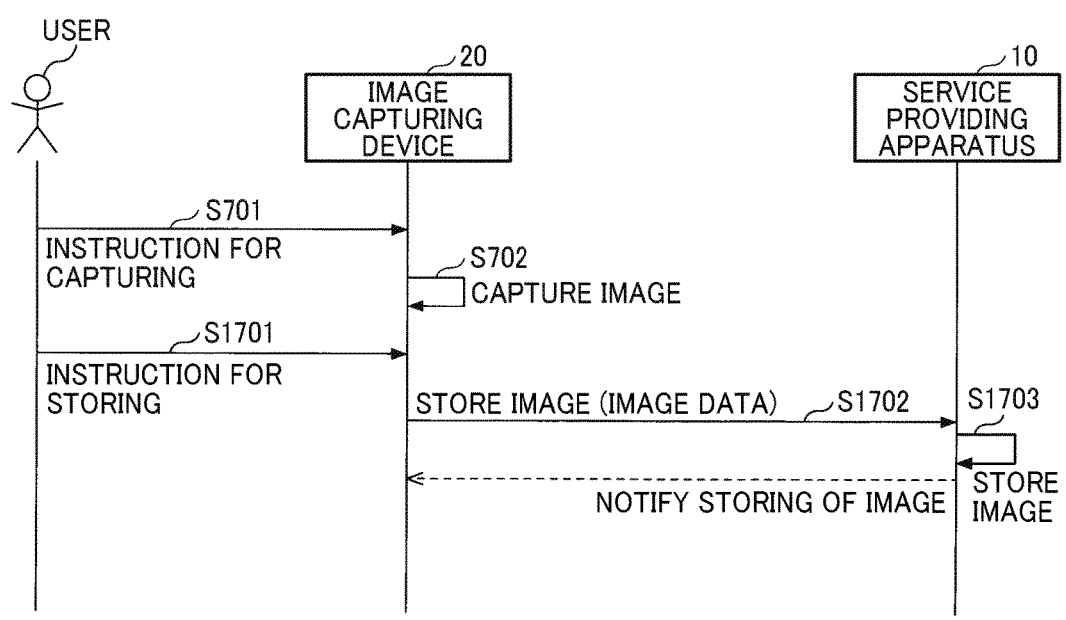
FIG. 16 is an example data structure of print image information according to the third embodiment.
FIG. 17 is a data sequence diagram illustrating operation of capturing images and storing the captured images, according to the third embodiment.

The print image data storage unit 109 stores therein the print image information. Referring to FIG. 16, the print image information stored in the print image data storage unit 109 is described according to the embodiment. FIG. 16 is an example data structure of print image information according to the third embodiment.

As illustrated in FIG. 16, the print image data storage unit 109 stores the print image information that includes data fields of a storage path and a print status. The storage path indicates a path to a storage area in the memory 18 where specific image data is stored. The print status indicates whether the image data for printing has been printed or not, by the printer 30. In FIG. 16, the print status "Done (Printed)" indicates that the image data has been printed, and the print status "Not Done (Not printed)" indicates that the image data has not been printed.

That is, the print image data storage unit 109 stores the print image information, which associates, for each image being stored, the storage path indicating a path to the storage area of the image data and the print status indicating whether the image data is printed.

Referring back to FIG. 15, the image sender 203 of the image capturing device 20 in the first embodiment is replaced with an image sender 203A, which functions differently than the image sender 203. More specifically, in response to the user instruction for storing (uploading) the pictures at the input acceptance unit 201, the image sender 203A sends to the service providing apparatus 10 a request for storing the image data of the pictures that have been captured with the image capturing unit 202.

Next, operation of the service providing system 1 is described according to the third embodiment.

First, referring to FIG. 17, operation of capturing one or more pictures and storing the captured pictures in the service providing apparatus 10 is described. FIG. 17 is a data sequence diagram illustrating operation of capturing one or more pictures and storing the pictures at the service providing apparatus 10, according to the third embodiment.

S701 and S702 are performed in a substantially similar manner as described above referring to S701 to S702 of FIG. 7. After capturing the pictures, the user instructs the image capturing device 20 to store the image data of one or more images captured with the image capturing unit 202, in the service providing apparatus 10. The input acceptance unit 201 of the image capturing device 20 receives the user instruction for storing the pictures (S1701).

The image sender 203A of the image capturing device 20 transmits a request for storing the image data to the service providing apparatus 10 (S1702). The request for storing is transmitted with the image data of the captured images. Alternatively, when the image data is captured with the image capturing unit 202, the image sender 203A of the image capturing device 20 may automatically transmit a request for storing the image data with the captured images to the service providing apparatus 10.

The data manager 108 of the service providing apparatus 10 stores the image data of one or more pictures, transmitted from the image capturing device 20, in a storage area of the memory 18. The data manager 108 further generates the print image information indicating a storage path for each image being stored. The data manager 108 then stores the generated printed image information in the print image data storage unit 109 (S1703). The data manager 108 enters a path to a storage area where each image data is stored, in the data field "storage path" of the print image information. The data manager 108 further enters "Not Done (Not printed)" in the data field "print status" of the print image information, to indicate that the image data has not been printed. The service providing apparatus 10 further transmits a notification indicating completion of storing the image data to the image capturing device 20.

As described above, pictures (images) that have been captured by the image capturing device 20 at an area where the service providing apparatus 10 and the printer 30 are provided, are stored in the service providing apparatus 10.

Figure 18:
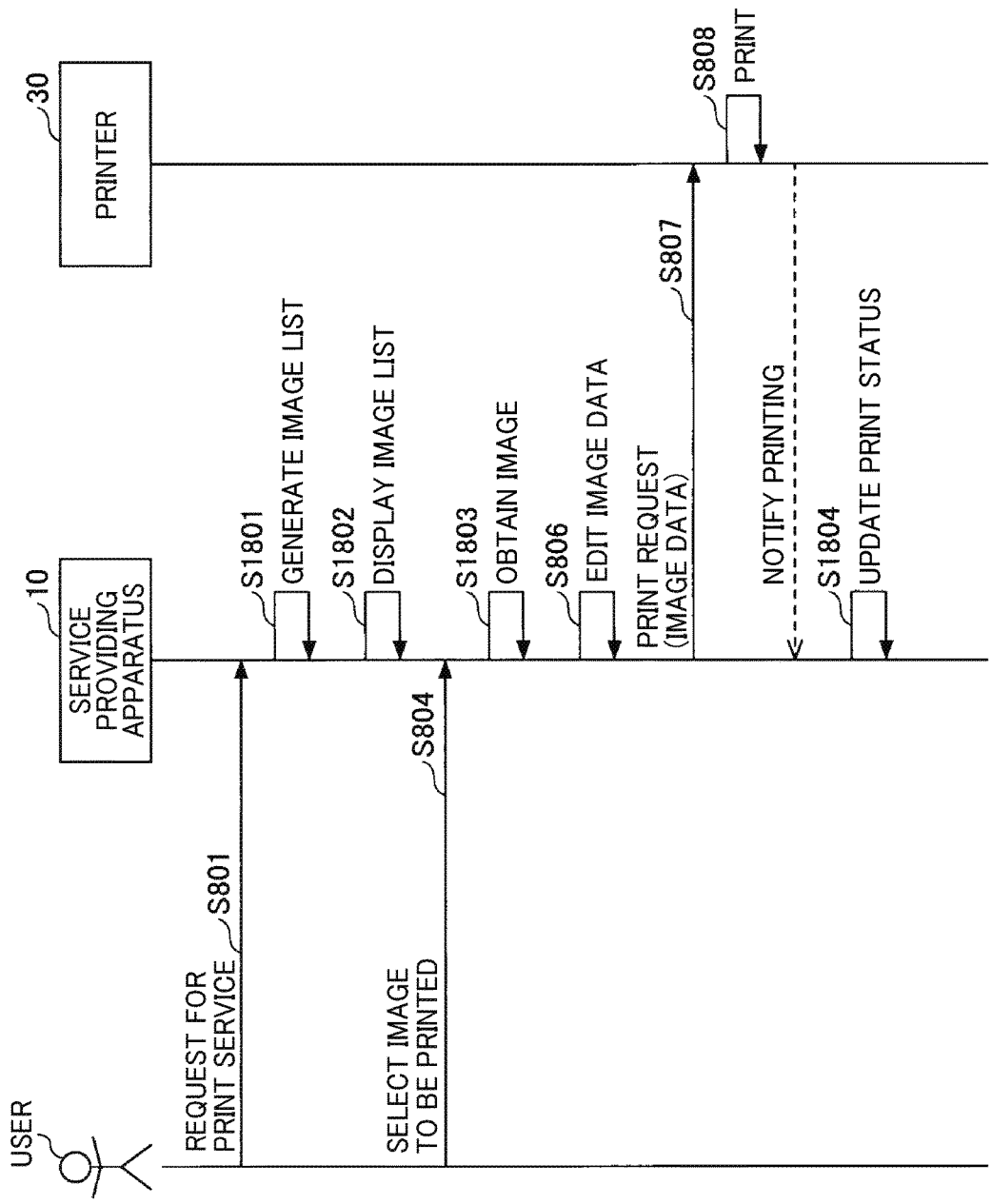
FIG. 18 is a data sequence diagram illustrating operation of printing images, performed by the service providing system of FIG. 15, according to the third embodiment.

Next, referring to FIG. 18, operation of printing one or more pictures that are stored at the service providing apparatus 10 is described, according to the embodiment. FIG. 18 is a data sequence diagram illustrating operation of printing one or more pictures stored at the service providing apparatus 10, according to the third embodiment.

The input acceptance unit 101 of the service providing apparatus 10 receives a user request for print service (S801). In response to the request, the data manager 108 generates a list of images for printing, based on the print image information stored in the print image data storage unit 109 (S1801).

As the list of pictures is generated, the display control 103 of the service providing apparatus 10 controls the display 12 to display a list screen that lists the pictures (S1802). In this embodiment, the list screen is substantially similar to the list screen 1000 as illustrated in FIG. 9, however, the "SNS service name" and the "hash tag" are not displayed.

In response to the print request received at the input acceptance unit 101, the data manager 108 of the service providing apparatus 10 obtains image data indicated by the storage path for the picture that has been selected by the user (S1803).

The data manager 106 of the service providing apparatus 10 updates the "print status" field in the print image information, which is associated with a storage path of the picture selected at S1803, from "Not Done (Not printed)" to "Done (Printed)" (S1804). The pictures (images) that have been printed with the printer 30 are then managed.

Through performing the operation of FIG. 18, in one example, an event staff, such as a photographer, is able to print pictures (images) that have been captured at a location where the service providing apparatus 10 and the printer 30 are provided (hair salon, wedding ceremony, etc.). The event staff, such as the photographer, can thus provide a printing service to visitors (customers) at the event hall (hair salon, wedding ceremony, etc.), to immediately print out the pictures taken at the event hall.

Figure 19:
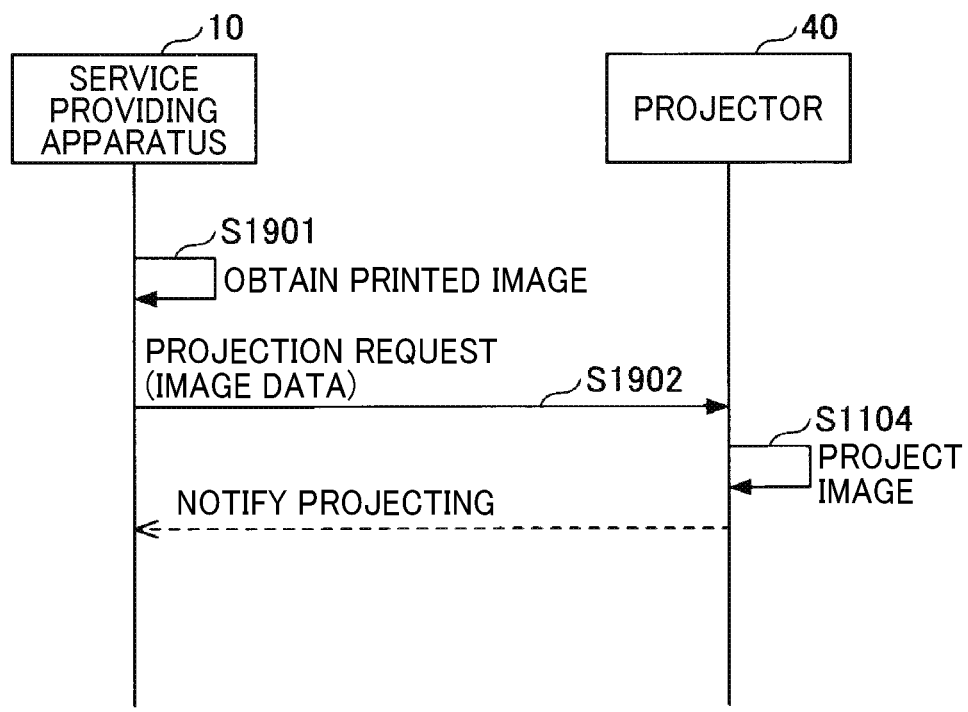
FIG. 19 is a data sequence diagram illustrating operation of projecting images, performed by the service proving system of FIG. 15, according to the third embodiment.

Referring to FIG. 19, operation of projecting the pictures (images) printed with the printer 30, using the projector 40, is described according to the embodiment. FIG. 19 is a data sequence diagram illustrating operation of projecting images according to the third embodiment.

The data manager 108 of the service providing apparatus 10 refers to the print image information stored in the print image information storage unit 109, to obtain storage paths for the pictures with the print status of "Done (Printed)". The data manager 108 obtains the image data of the pictures indicated by the obtained storage paths (S1901).

The projection processor 106 of the service providing apparatus 10 transmits a projection request for projecting the obtained image data to the projector 40 (S1902). The projection request is sent with the image data obtained at S1901.

As described above, pictures (images) that have been captured at a location where the service providing apparatus 10 and the printer 30 are provided (hair salon, wedding ceremony, etc.), can be projected with the projector 40. The projector 40 may send a notification indicating completion of projection of the images.

Referring to FIGS. 20 to 23, the service providing apparatus 10 is described according to a fourth embodiment. The fourth embodiment differs from the third embodiment in that code information is added to the printed image, which is used for accessing content related to the printed image.

Figure 20:
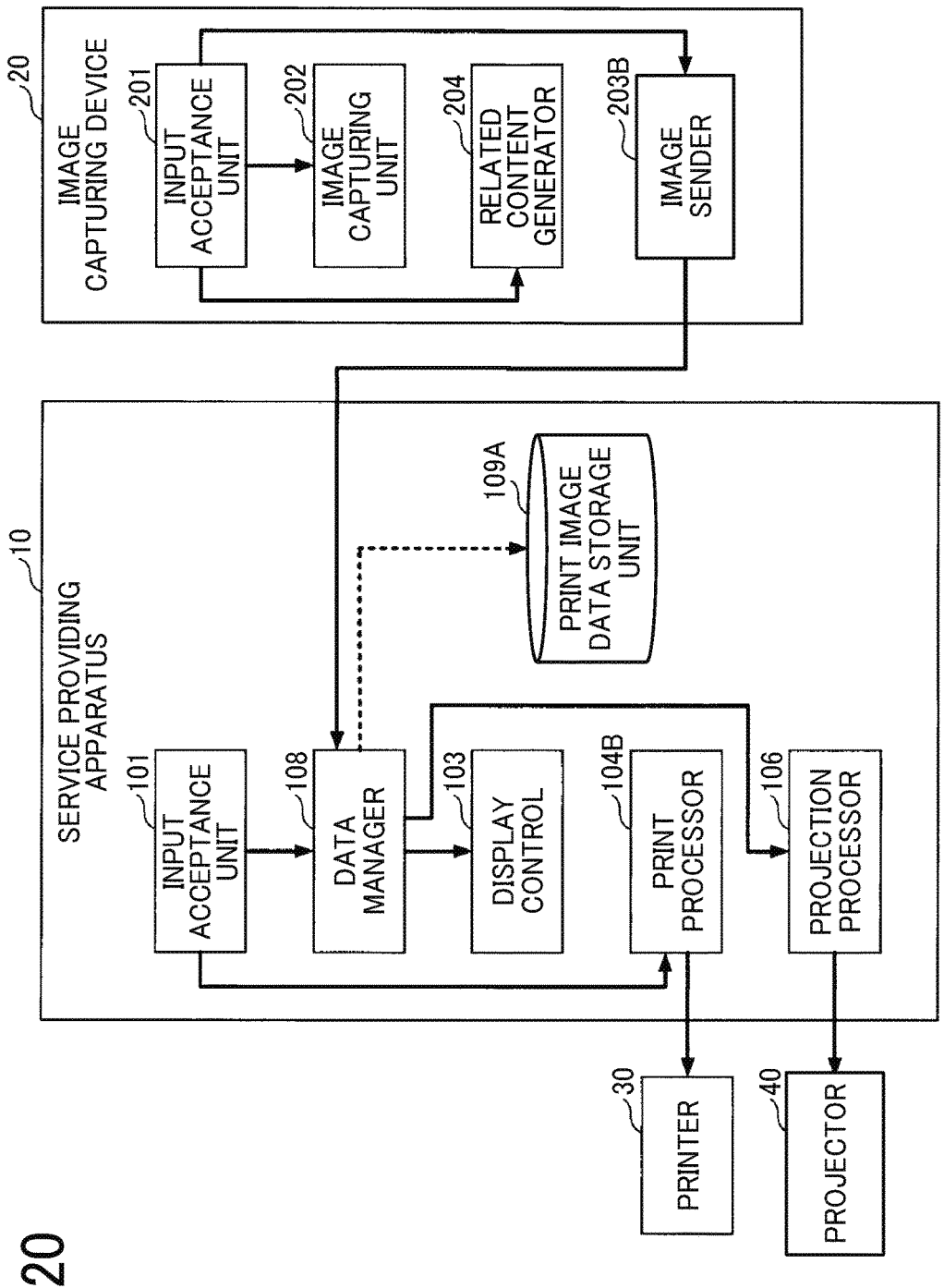
FIG. 20 is a schematic diagram illustrating a functional configuration of a service providing system according to a fourth embodiment.

Referring now to FIG. 20, a functional configuration of the service providing system 1 is described according to the fourth embodiment. FIG. 20 is a schematic diagram illustrating a functional configuration of the service providing system 1 according to the fourth embodiment.

As illustrated in FIG. 20, in this embodiment, the print processor 104 of the service providing apparatus 10 (FIG. 15) is replaced with a print processor 104B. The print processor 104B generates code information such as the QR code. In this embodiment, the print processor 104B generates code information, which is used to access content data related to the event.

The print processor 104B adds the generated code information to the image data, and transmits the image data with the code information to the printer 30 with a print request.

Figures 21, 22:
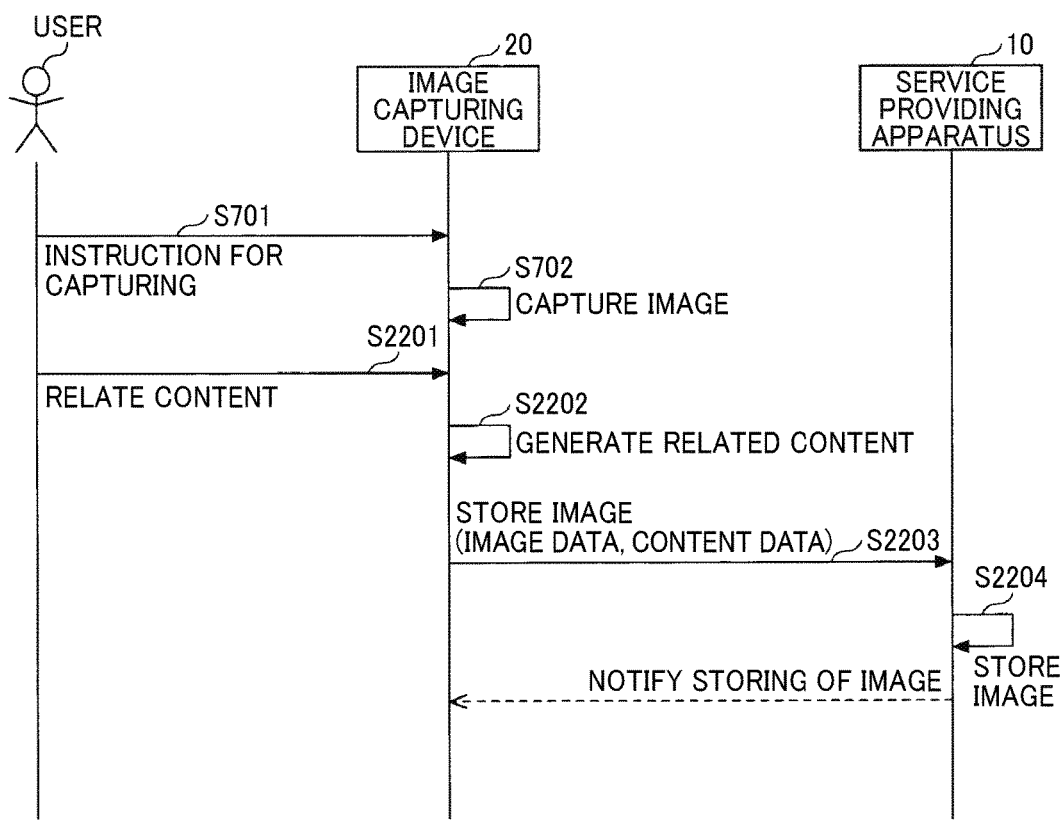
FIG. 21 is an example data structure of print image information according to the fourth embodiment.
FIG. 22 is a data sequence diagram illustrating operation of capturing images and storing the captured images, performed by the service providing system of FIG. 20, according to the fourth embodiment.

For the service providing apparatus 10 of this embodiment, the print data storage unit 109 (FIG. 15) is replaced with a print image data storage unit 109A, which stores different types of print image information. Referring to FIG. 21, the print image information stored in the print image data storage unit 109A is described according to the embodiment. FIG. 21 is an example data structure of print image information according to the fourth embodiment.

As illustrated in FIG. 21, the print image data storage unit 109A stores the print image information that includes data fields of a storage path, a print status, and a related content storage URL. The related content storage URL is a URL of an area where related content data related the picture (image) is stored. Examples of related content data include, but not limited to, other picture, music, audio, video, message, etc. that relates to the stored picture. The data manager 108 stores the related content data in a storage area of the memory 18.

The print image data storage unit 109A stores the print image information, which associates, for each image being stored, the storage path indicating a path to the storage area of the image data, the print status indicating whether the image data is printed, and the related content storage path indicating a path to the storage area of the related content for the image data.

Referring back to FIG. 20, the image sender 203A of the image capturing device 20 (FIG. 15) is replaced with an image sender 203B. The image capturing device 20 of FIG. 20 further includes a related content generator 204.

The related content generator 204 generates related content data, which is associated with the image data captured at the image capturing unit 202. More specifically, in response to the user instruction for storing (uploading) the pictures at the input acceptance unit 201, the image sender 203B sends to the service providing apparatus 10 a request for storing the image data of the pictures that have been captured with the image capturing unit 202, and the related content data generated with the related content generator 204.

Next, operation of the service providing system 1 is described according to the fourth embodiment.

Next, referring to FIG. 22, operation of capturing one or more pictures (images) and storing at the service providing apparatus 10 is described, according to the embodiment. FIG. 22 is a data sequence diagram illustrating operation of capturing images and storing the captured images, according to the fourth embodiment.

S701 and S702 are performed in a substantially similar manner as described above referring to FIG. 17. The user instructs the image capturing device 20 to generate content data to be associated with the image data captured at the image capturing unit 202. The input acceptance unit 201 of the image capturing device 20 receives an instruction for generating and associating content data with the image data (S2201).

Next, the related content generator 204 of the image capturing device 20 generates related content data (S2202).

In one example, the related content generator 204 may generate audio data, based on user's voice collected through a microphone, as related content data. In another example, the related content generator 204 may obtain music data, video data, or text data, which is stored in the image capturing device 20, to be used as related content data. Such music data, video data, or text data are assumed to be related to the event that the user has taken the images. In another example, the related content generator 204 may obtain a URL of a webpage relating to the event that the user has taken the images, as related content data.

As described above, the related content generator 204 is able to generate related content data of any type, according to an instruction from the user.

The image sender 203B sends to the service providing apparatus 10 a request for storing the image data of the pictures that have been captured with the image capturing unit 202, and the related content data generated with the related content generator 204 for the captured images (S2203).

The data manager 108 of the service providing apparatus 10 stores the image data of one or more pictures and the related content data for the pictures, transmitted from the image capturing device 20, in a storage area of the memory 18. The data manager 108 further generates the print image information indicating a storage path for each image being stored. The data manager 108 then stores the generated printed image information in the print image data storage unit 109A (S2204).

As described above, pictures (images) that have been captured by the image capturing device 20 at an area where the service providing apparatus 10 and the printer 30 are provided, are stored in the service providing apparatus 10, with the related content data for the captured images.

Next, referring to FIG. 23, operation of printing one or more pictures that are stored at the service providing apparatus 10 is described, according to the embodiment. FIG. 23 is a data sequence diagram illustrating operation of printing images, performed by the service providing system of FIG. 20, according to the fourth embodiment.

S801 to S1803 are performed in a substantially similar manner as described above referring to FIG. 18. After the image data is obtained at the data obtainer 102, the print processor 104B of the service providing apparatus 10 generates code information, which is to be added to the image data of one or more pictures that is obtained. More specifically, the print processor 104B generates code information encoded with a related content storage which is associated with the storage path of the obtained image data in the print image information.

The print processor 104B edits the obtained image data, for example, according to the frame selected from the frame list 2200 on the print preview screen 2000 illustrated in FIG. 10A. The print processor 104B further adds the generated code information to the edited image data (S2301).

The print processor 104B of the service providing apparatus 10 transmits a print request for printing the edited image data added with the coded information, to the printer 30 (S2302). The edited image data is sent with the print request.

For example, the printer 30 prints a printed material 3000, for example, as illustrated in FIG. 14. Through reading the QR code 3100 with a smart phone or a tablet, the user can access related content data specified by the QR code 3100, for example.

Through performing the operation of FIG. 23, in one example, an event staff, such as a photographer, is able to print pictures (images) that have been captured at a location where the service providing apparatus 10 and the printer 30 are provided (hair salon, wedding ceremony, etc.). Further, the printed image that has been printed with the printer 30 has code information to be used for accessing related content data that is related to the printed image.

Through reading the code information with such as a smartphone, the user who has printed the image is able to access content related to the printed image. For example, the visitor who has participated in the event is able to access related content, such as music played at the event, in addition to having the printed image.

In the above-described service providing system 1, the image capturing device 20 generates related content data at S2202 of FIG. 22. However, related content data may be generated by any other apparatus, at any other time. For example, related content data may be generated when printing the image.

More specifically, at S2302, the user may instruct the service providing apparatus 10 to generate related content data, and add code information to be used for accessing the related content data. In one example, the user may instruct the service providing apparatus 10 to generate related content data, based on a message input by the user. The message may be written by the user with an electronic pen or recorded by collecting the user's voice with a microphone. The electronic pen or the microphone is thus one example of the input device 11. Further, in this embodiment, the service providing apparatus 10 may obtain any picture (image) from the SNS service 60 for printing, in a substantially similar manner as described above referring to the first and second embodiments.

In such case, the service providing apparatus 10 generates related content data for the picture (image) obtained from the SNS service 60, and adds code information of the related content data to the picture (image) when printing.

In case the message is generated using the service providing apparatus 10, the service providing apparatus 10 may request the printer 30 to print the generated message with the captured image, in alternative to printing the generated message in the form of a code. For example, the message may be overlaid on the picture, when printed. In this way, the service providing apparatus 10 is able to output a printed image with a message.

In such case, the service providing apparatus 10 may combine a plurality of images selected by the user into one image to generate a combined image, and adds the messages for the respective pictures on the combined image. In this way, the service providing apparatus 10 is able to generate a photo album including photos with messages.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in alternative to selecting one or more pictures to be printed at the service providing apparatus 10, the user may select such pictures with the image capturing device 20. For example, S802 and S803 of FIG. 8 may be performed at the image capturing device 20. In such case, the image capturing device 20 may send information indicating the one or more images to be printed to the service providing apparatus 10 at S804. Based on the information received from the image capturing device 20, the service providing apparatus 10 obtains image data of the one or more images to be printed to perform subsequent processing.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (IMP), field programmable gate array (FPGA), and conventional circuit components arranged to perform the recited functions.

The invention claimed is:

1. An information processing apparatus configured to connect with a printer and a display, the information processing apparatus comprising:
   a network interface to obtain one or more images from a social network service (SNS) server through a network;
   a processor to control the printer to print the one or more images that are obtained to output one or more printed images, in response to a print request received from a first user; and
   control the display to display the one or more images that has been printed with the printer, the images being displayed to one or more users other than the first user,
   the processor being further configured to receive, from the display, a request for one or more images to be displayed during a time interval, and
   the processor being further configured to transmit a response, including the one or more images requested that has been printed via the printer, to the display.

2. The information processing apparatus of claim 1, wherein the network interface is further configured to receive a list of a plurality of images available for printing by the first user from the SNS server through the network, and
   wherein the processor is further configured to receive an instruction for selecting, from the list of the plurality of images, the one or more images to be printed, and control the printer to print the one or more images that are selected based on the instruction.

3. The information processing apparatus of claim 1, wherein the network interface is further configured to receive a list of a plurality of images available for printing by the first user from the SNS server through the network and wherein the plurality of images on the list are each assigned with a hash tag entered or selected by the first user.

4. The information processing apparatus of claim 1, wherein the network interface is further configured to receive a list of a plurality of images available for printing by the first user from the SNS server through the network and wherein the plurality of images on the list are all posted on a specific page of the SNS server.

5. The information processing apparatus of claim 1, further comprising:
   a memory to store printed data information indicating, for each of the one or more images that have been printed, a storage area where the image that has been printed with the printer is stored,
   wherein the processor updates the printed data information in the memory based on a notification indicating completion of printing from the printer.

6. The information processing apparatus of claim 1, wherein the processor is further configured to:
   add code information to the image to be printed, such that the printer outputs the printed image having the code information.

7. The information processing apparatus of claim 6, further comprising:
 a memory to store, for each one of the one or more images to be printed, information indicating a storage area where content data related to the image to be printed is stored,
 wherein the processor encodes the information indicating the storage area where the content data is stored, in the code information to be printed with the image.

8. The information processing apparatus of claim 2, wherein an advertisement is added to an outer area of the one or more images, the printer is controlled to print the one or more images, including the advertisement, that are selected based on the instruction.

9. The information processing apparatus of claim 1, wherein the network interface is configured to obtain one or more images from a social network service (SNS) server through a network, and to associate the one or more images obtained with a hash tag.

10. An information processing system, comprising:
 one or more processors to connect with a social network service (SNS) server through a network;
 a printer to connect with the one or more processors;
 a display to connect with the one or more processors;
 wherein the one or more processors are configured to:
  obtain image data of one or more images from the SNS server;
  control the printer to print one or more images based on the image data to output one or more printed images, in response to a print request received from a first user;
  control the display to display one or more images based on the image data that has been printed with the printer, the images being displayed to one or more users other than the first user;
  receive, from the display, a request for one or more images to be displayed during a time interval; and
  transmit a response, including the one or more images requested that has been printed via the printer, to the display.

11. The information processing system of claim 10, wherein the display includes at least one of a projector and a digital signage.

12. The information processing system of claim 10, wherein the network interface is further configured to receive a list of a plurality of images available for printing by the first user from the SNS server through the network, wherein the one or more processors is further configured to receive an instruction for selecting, from the list of the plurality of images, the one or more images to be printed, wherein an advertisement is added to an outer area of the one or more images, and wherein the printer is controlled to print the one or more images, including the advertisement, that are selected based on the instruction.

13. The information processing system of claim 10, wherein the one or more processors are further configured to:
 associate the one or more images, obtained from the SNS server, with a hash tag.

14. An information processing apparatus configured to connect with a printer and a display, the information processing apparatus comprising:
 a memory to store, for each one of a plurality of images captured with an image capturing device, information indicating a storage area where the image is stored and a print status indicating whether the image has been printed with the printer; and
 a processor to:
  control the printer, in response to an instruction for selecting one or more images to be printed from a first user, to print the one or more images of the plurality of images, to output one or more printed images;
  update, for each of the one or more images that has been printed, the print status of the respective selected one or more images to indicate that the respective one of the one or more images has been printed with the printer;
  control the display to display one or more images, that has been printed with the printer, each of the one or more images being respectively associated with the print status indicating that the respective one of the one or more images has been printed, the one or more images being displayed to one or more users other than the first user,
 wherein the memory is further configured to store, for each respective one of the one or more images selected to be printed, information indicating a storage area where content data, related to each respective one of the one or more images selected to be printed, is stored, and
 wherein the processor is further configured to encode the information, indicating the storage area where the content data is stored, for printing with the respective one of the one or more images.

15. The information processing apparatus of claim 14, wherein the processor is further configured to receive an instruction for selecting, from the one or more images of the plurality of images, the one or more images to be printed, wherein an advertisement is added to an outer area of the one or more images, and wherein the printer is controlled to print the one or more images, including the advertisement, that are selected based on the instruction.

16. The information processing apparatus of claim 14, wherein the processor is further configured to associate the one or more images with a hash tag.

* * * * *